(12) United States Patent
Uchiyama

(10) Patent No.: US 10,137,574 B2
(45) Date of Patent: Nov. 27, 2018

(54) IMAGE PROCESSING APPARATUS, IMAGE PROCESSING SYSTEM, IMAGE PROCESSING METHOD, AND COMPUTER PROGRAM

(71) Applicant: Keyence Corporation, Osaka (JP)

(72) Inventor: Naoya Uchiyama, Osaka (JP)

(73) Assignee: Keyence Corporation, Osaka (JP)

( * ) Notice: Subject to any disclaimer, the term of this patent is extended or adjusted under 35 U.S.C. 154(b) by 315 days.

(21) Appl. No.: 14/955,067

(22) Filed: Dec. 1, 2015

(65) Prior Publication Data

US 2016/0184995 A1 Jun. 30, 2016

(30) Foreign Application Priority Data

Dec. 25, 2014 (JP) ................................. 2014-262243

(51) Int. Cl.
 *B25J 9/16* (2006.01)
 *H04N 5/232* (2006.01)
 *G06T 7/73* (2017.01)

(52) U.S. Cl.
 CPC ............ *B25J 9/1692* (2013.01); *B25J 9/1697* (2013.01); *G06T 7/73* (2017.01); *H04N 5/232* (2013.01); *G06T 2207/10016* (2013.01); *G06T 2207/30208* (2013.01); *G06T 2207/30241* (2013.01); *Y10S 901/09* (2013.01)

(58) Field of Classification Search
 CPC .............................. B25J 9/1697; B25J 9/1692
 USPC ....................................... 700/259; 901/2, 47
 See application file for complete search history.

(56) References Cited

U.S. PATENT DOCUMENTS

| 6,681,151 | B1* | 1/2004 | Weinzimmer | ......... B25J 9/1697 |
| | | | | 219/121.85 |
| 6,889,118 | B2* | 5/2005 | Murray, IV | .............. B25J 9/161 |
| | | | | 318/568.11 |
| 8,355,816 | B2* | 1/2013 | Saito | ...................... B25J 9/1612 |
| | | | | 700/118 |
| 9,195,233 | B2* | 11/2015 | Perrone | ................ G05D 1/0088 |
| 2013/0010081 | A1* | 1/2013 | Tenney | .................. A61B 34/30 |
| | | | | 348/47 |
| 2013/0197696 | A1* | 8/2013 | Nammoto | .............. B25J 9/1612 |
| | | | | 700/259 |

(Continued)

FOREIGN PATENT DOCUMENTS

JP 04-134501 5/1992
JP 09-091022 4/1997

*Primary Examiner* — Timothy R Waggoner
(74) *Attorney, Agent, or Firm* — Kilyk & Bowersox, P.L.L.C.

(57) ABSTRACT

A movement command to move an end effector to a plurality of predetermined positions is transmitted to a robot controller so as to change a relative position of a target, which becomes an imaging target, with respect to an imaging device. First coordinate values are acquired, the values being each of position coordinates of the end effector having moved in accordance with the movement command, and an image of the target is captured at each movement destination, to which the end effector has moved. Second coordinate values being position coordinates of the target are detected based on the image of the target captured at each movement destination, and a conversion rule between both of the coordinates is calculated based on the first coordinate values and the second coordinate values.

13 Claims, 35 Drawing Sheets

(56) References Cited

U.S. PATENT DOCUMENTS

| | | | |
|---|---|---|---|
| 2013/0238128 A1* | 9/2013 | Suzuki | B25J 9/1669 |
| | | | 700/258 |
| 2014/0229005 A1* | 8/2014 | Suzuki | B25J 9/1692 |
| | | | 700/254 |
| 2014/0288710 A1* | 9/2014 | Ikenaga | B25J 9/1697 |
| | | | 700/259 |
| 2016/0184997 A1 | 6/2016 | Uchiyama | |
| 2018/0194008 A1* | 7/2018 | Namiki | B25J 9/1692 |

* cited by examiner

FIG. 18

```
OPEN "COM1:" AS#1  }1801

WHILE1
   INPUT #1, Val1, Val2, Val3  }1802

IF=Str$="MV"THEN
     POS1.X=Val1
     POS1.Y=Val2      }1803
     POS1.T=Val3
      MOVE POS
  ELSE IF Str$="**"THEN
    ...

ENDIF

WEND
```

FIG. 32

```
321 { OPEN "COM1:" AS#1

322 { MOVE POS0

323 { PRINT #1, "T1"

324 { INPUT #1, Val1, Val2, Val3

POS1.X=Val1
325 { POS1.Y=Val2
    POS1.T=Val3

326 { MOVE POS1

//COMMENT: CLOSE HAND

327 { //COMMENT: MOVE TO PLACING POSITION

//COMMENT: OPEN HAND

328 { CLOSE #1
```

IMAGE PROCESSING APPARATUS, IMAGE PROCESSING SYSTEM, IMAGE PROCESSING METHOD, AND COMPUTER PROGRAM

CROSS-REFERENCE TO RELATED APPLICATIONS

The present application claims foreign priority based on Japanese Patent Application No. 2014-262243, filed Dec. 25, 2014, the contents of which is incorporated herein by reference.

BACKGROUND OF THE INVENTION

1. Field of the Invention

The present invention relates to an image processing apparatus, an image processing system, an image processing method, and a computer program which are capable of executing calibration with high accuracy without creating a complex robot motion control program.

2. Description of Related Art

There have been developed a large number of control systems in which an image of a working area of a robot is captured by an imaging device, a position of a workpiece in the captured image is detected, and position information of the detected workpiece is calculated based on the captured image, to control a motion of the robot with high accuracy.

For example, Unexamined Japanese Patent Publication No. H4-134501 discloses a robot controller that controls a robot motion based on information detected by a sensor including an imaging device. Further, Unexamined Japanese Patent Publication No. H9-091022 discloses a robot controller that transmits a load module (robot motion control program) compiled in an external computer, to control a robot motion.

As thus described, for controlling an elaborate motion, the conventional robot control system requires conversion from position coordinates calculated in a coordinate system displayed in an image processing apparatus to position coordinates in a coordinate system with which the robot controller allows an end effector to make a motion. Processing to calculate a conversion formula for performing the coordinate conversion is called calibration. The end effector herein means an end portion of a robot arm, which can grasp and firmly fix a workpiece, for example.

At the time of executing the calibration, for example, position coordinates of the robot, with its end effector grasping the workpiece and having been moved to a plurality of predetermined positions, are compared with position coordinates on an image of the workpiece captured by the imaging device, which are detected based on the captured image, to enable calculation of the conversion formula.

For correctly executing the calibration, the robot controller moves the end effector to an appropriate position, and transmits an imaging instruction signal to the image processing apparatus in this movement destination, and moves the end effector to the next position. It has been necessary for a user to create a sequential robot motion control program for repeating the above operation.

Further, it has also been necessary for the user to perform processing for receiving the imaging instruction signal to detect a position of the workpiece in the image processing apparatus. That is, the user needs to be skillful in both setting the robot motion control program and setting the image processing apparatus, and this has been a remote cause of taking considerable time to start-up of the whole system.

Moreover, the robot controller plays a principal role in controlling a motion of the robot, and goes so far as controlling a motion of the sensor including the imaging device. Accordingly, without familiarity with the robot motion control program, the user has difficulties in allowing the robot to make a desired motion, and also cannot precisely execute the calibration, which has been problematic.

SUMMARY OF THE INVENTION

The present invention was made in view of such circumstances. It is an object of the present invention to provide an image processing apparatus, an image processing system, an image processing method, and a computer program which are capable of executing calibration with high accuracy without creating a complex robot operation control program.

For achieving the above object, an image processing apparatus according to one embodiment is an image processing apparatus including a communication device and an imaging device. The communication device is capable of performing data communication with a robot controller that controls a motion of a robot. The imaging device captures an image of a target being an operation target of the robot. The image processing apparatus includes a command transmitting unit, a movement coordinate acquiring unit, an imaging controlling unit, an image detecting unit, and a calibration executing unit. The command transmitting unit transmits to the robot controller a movement command to move an end effector to a plurality of predetermined positions so as to change a relative position of the target, which becomes an imaging target, with respect to the imaging device. The movement coordinate acquiring unit acquires first coordinate values being each of position coordinates of the end effector having moved in accordance with the movement command. The imaging controlling unit controls an operation of the imaging device so as to capture an image of the target at each movement destination, to which the end effector has moved. The image detecting unit detects second coordinate values being position coordinates of the target based on the image of the target captured at each movement destination. The calibration executing unit calculates a conversion rule between both of the coordinates based on the plurality of acquired first coordinate values and the plurality of detected second coordinate values.

Further, in an image processing apparatus according to another embodiment, it is preferable that in the first aspect, the command transmitting unit transmits to the robot controller the movement command including at least a movement instruction and position coordinates of the movement destination.

Further, an image processing apparatus according to still another embodiment preferably includes, in the first or second aspect, a coordinate detecting unit for detecting the second coordinate values being position coordinates of the imaged target; and a coordinate converting unit for converting the detected second coordinate values to the first coordinate values based on the conversion rule.

Further, an image processing apparatus according to still another embodiment preferably includes, in the third aspect, a display unit for displaying the captured image of the target; and a position specification accepting unit for accepting specification of a position on the displayed image of the target. In the apparatus, it is preferable that the second coordinate values at the position, the specification of which has been accepted, be converted to the first coordinate values by the coordinate converting unit based on the conversion rule.

Further, in an image processing apparatus according to still another embodiment, it is preferable that, in any one of the first to fourth aspects, the first coordinate values acquired by the movement coordinate acquiring unit be converted to the second coordinate values based on the conversion rule, and the converted values be superimposed and displayed on the displayed captured image of the target.

Next, for achieving the above object, an image processing system according to still another embodiment is an image processing system including a robot controller and an image processing apparatus. The robot controller controls a motion of a robot. The image processing apparatus includes a communication device connected to the robot controller so as to perform data communications therewith, and an imaging device that captures an image of a target being an operation target of the robot. In the system, the image processing apparatus includes a command transmitting unit, a movement coordinate acquiring unit, an imaging controlling unit, an image detecting unit, and a calibration executing unit. The command transmitting unit transmits to the robot controller a movement command to move an end effector to a plurality of predetermined positions so as to change a relative position of the target, which becomes an imaging target, with respect to the imaging device. The movement coordinate acquiring unit acquires first coordinate values being each of position coordinates of the end effector having moved in accordance with the movement command from the robot controller. The imaging controlling unit controls an operation of the imaging device so as to capture an image of the target at each movement destination, to which the end effector has moved. The image detecting unit detects second coordinate values being position coordinates of the target based on the image of the target captured at each movement destination. The calibration executing unit calculates a conversion rule between both of the coordinates based on the plurality of acquired first coordinate values and the plurality of detected second coordinate values.

Further, in an image processing system according to still another embodiment, it is preferable that in the sixth aspect, the command transmitting unit transmit to the robot controller the movement command including at least a movement instruction and position coordinates of the movement destination.

Further, in an image processing system according to still another embodiment, it is preferable that in the sixth or seventh aspect, the image processing apparatus include a coordinate detecting unit for detecting the second coordinate values being position coordinates of the imaged target, and a coordinate converting unit for converting the detected second coordinate values to the first coordinate values based on the conversion rule.

Further, in an image processing system according to still another embodiment, it is preferable that in the eighth aspect, the image processing apparatus include a display unit for displaying the captured image of the target, and a position specification accepting unit for accepting specification of a position on the displayed image of the target. In the system, it is preferable that the second coordinate values at the accepted specified position be converted to the first coordinate values based on the conversion rule.

Further, in an image processing system according to still another embodiment, it is preferable that in any one of the sixth to ninth aspects, the image processing apparatus convert the first coordinate values acquired by the movement coordinate acquiring unit to the second coordinate values based on the conversion rule, and superimpose and display the converted values on the displayed captured image of the target.

Further, in an image processing system according to still another embodiment, it is preferable that in any one of the sixth to tenth aspects, the robot controller include a program converting unit for interpreting the movement command and converting the interpreted command to a movement command to the end effector.

Further, in an image processing system according to still another embodiment, it is preferable that, in the eleventh aspect, the program converting unit be provided for each type of the robot, and convert the movement command to a movement command to the end effector in accordance with the type of the robot.

Next, for achieving the above object, an image processing method according to still another embodiment is an image processing method which can be executed by an image processing system composed of a robot controller and an image processing apparatus. The robot controller controls a motion of a robot. The image processing apparatus includes a communication device connected to the robot controller so as to perform data communications therewith, and an imaging device that captures an image of a target being an operation target of the robot. The image processing method includes the steps of; transmitting to the robot controller a movement command to move an end effector to a plurality of predetermined positions so as to change a relative position of the target, which becomes an imaging target, with respect to the imaging device; acquiring first coordinate values being each of position coordinates of the end effector having moved in accordance with the movement command; controlling an operation of the imaging device so as to capture an image of the target at each movement destination, to which the end effector has moved; detecting second coordinate values of the target based on the captured image; and calculating a conversion rule between both of the coordinates based on the plurality of acquired first coordinate values and the plurality of detected second coordinate values.

Next, for achieving the above object, a computer program according to still another embodiment is a computer program which can be executed by an image processing apparatus including a communication device and an imaging device. The communication device is capable of performing data communication with a robot controller that controls a motion of a robot. The imaging device captures an image of a target being an operation target of the robot. The program allows the image processing apparatus to function as a command transmitting unit, a movement coordinate acquiring unit, an imaging controlling unit, an image detecting unit, and a calibration executing unit. The command transmitting unit transmits to the robot controller a movement command to move an end effector to a plurality of predetermined positions so as to change a relative position of the target, which becomes an imaging target, with respect to the imaging device. The movement coordinate acquiring unit acquires first coordinate values being each of position coordinates of the end effector having moved in accordance with the movement command. The imaging controlling unit controls an operation of the imaging device so as to capture an image of the target at each movement destination, to which the end effector has moved. The image detecting unit detects second coordinate values of the target based on the image of the target captured at each movement destination. The calibration executing unit calculates a conversion rule between both of the coordinates based on the plurality of acquired first coordinate values and the plurality of detected second coordinate values.

In the first, sixth, thirteenth, and fourteenth aspects, in the image processing apparatus, a movement command to move the end effector to a plurality of predetermined positions is transmitted to the robot controller so as to change a relative position of the target, which becomes an imaging target, with respect to the imaging device, and first coordinate values are acquired, the values being each of position coordinates of the end effector having moved in accordance with the movement command. An image of the target is captured at each movement destination, to which the end effector has moved. Second coordinate values being position coordinates of the target are detected based on the image of the target captured at each movement destination. Based on the plurality of acquired first coordinate values and the plurality of detected second coordinate values, a conversion rule between both of the coordinates is calculated. Accordingly, the image processing apparatus can transmit the movement command to control the motion of the robot to the robot controller, thereby eliminating the need for the user to understand machine language which varies by type of the robot. It is thus possible to obtain the conversion rule between the position coordinates recognized by the robot controller (the first coordinate values) and the position coordinates detected from the captured image of the target (the second coordinate values), so as to control the motion of the robot with high accuracy.

In the second and seventh aspects, the movement command, which includes at least the movement instruction and the position coordinates of the movement destination, is transmitted to the robot controller, thereby eliminating the need for the user to understand each machine language even when the type of the robot varies. It is thus possible to obtain the conversion rule between the position coordinates recognized by the robot controller (the first coordinate values) and the position coordinates detected from the captured image of the target (the second coordinate values), so as to control the motion of the robot with high accuracy.

In the third and eighth aspects, in the image processing apparatus, second coordinate values being position coordinates of the captured target are detected, and the detected second coordinate values are converted to the first coordinate values based on the conversion rule. Hence, even a movement instruction made on the image processing apparatus allows accurate movement of the robot to an intended position.

In the fourth and ninth aspects, in the image processing apparatus, the captured image of the target is displayed, specification of a position on the displayed image of the target is accepted, and the image processing apparatus converts the second coordinate values at the specification accepted position to the first coordinate values based on the conversion rule. Hence, a movement destination of the robot can be instructed on the image, to move the robot to the position in accordance with the accepted instruction.

In the fifth and tenth aspects, in the image processing apparatus, the acquired first coordinate values are converted to the second coordinate values based on the conversion rule, and the converted values are superimposed and displayed on the displayed image of the target. This enables checking of the position of the robot after movement on the displayed image of the target.

In the eleventh aspect, the robot controller interprets the movement command and converts the interpreted command to a movement command to the end effector. This eliminates the need for the user to understand machine language for each type of the robot, and enables control of the motion of the robot.

In the twelfth aspect, the program converting unit is provided for each type of the robot, and converts the movement command to a movement command to the end effector in accordance with the type of the robot. Thus, a conversion program in accordance with the type of the robot to be used can be installed into the robot controller, to convert the movement command to a movement command to the end effector in accordance with the type of the robot.

According to the present invention, the image processing apparatus can transmit the movement command to control the motion of the robot to the robot controller, thereby eliminating the need for the user to understand machine language which varies by type of the robot. It is thus possible to obtain the conversion rule between the position coordinates recognized by the robot controller (the first coordinate values) and the position coordinates detected from the captured image of the target (the second coordinate values), so as to control the motion of the robot with high accuracy.

BRIEF DESCRIPTION OF THE DRAWINGS

FIG. 18 is an illustrative view of the conversion program for the robot controller according to the first embodiment of the present invention;

FIG. 32 is an illustrative view of a program for a robot controller according to the second embodiment of the present invention;

DETAILED DESCRIPTION OF PREFERRED EMBODIMENTS

In the following, an image processing system according to embodiments of the present invention will be described with reference to the drawings.

(First Embodiment)

Figure 1:
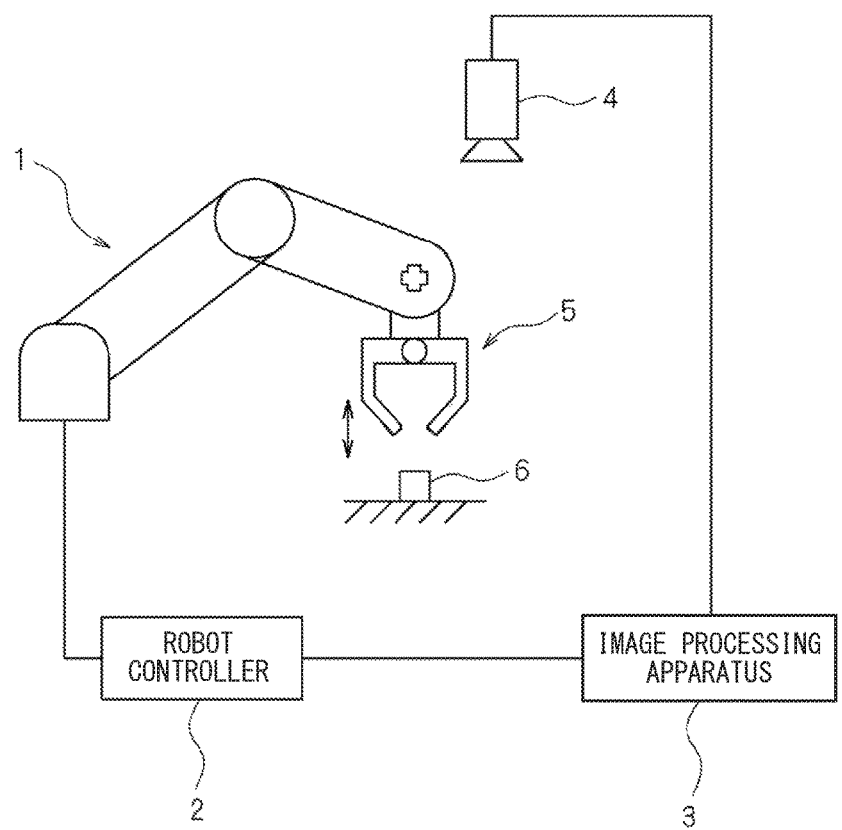
FIG. 1 is a schematic view showing a configuration of an image processing system according to a first embodiment of the present invention.

FIG. 1 is a schematic view showing a configuration of an image processing system according to a first embodiment of the present invention.

As shown in FIG. 1, an image processing system according to the present first embodiment includes a manipulator (robot) 1 for moving a target (workpiece) 6, a robot controller 2 for controlling a motion of the manipulator 1, an image processing apparatus 3, and an imaging device 4. An end effector 5 capable of grasping or releasing the target 6 is provided at the end of the manipulator 1. The robot controller 2 also controls opening and closing motions of the end effector 5.

The imaging device 4 is, for example, a color CCD camera, and captures an image of the workpiece 6 being a moving target. Executing later-mentioned calibration based on the captured image allows linkage between actual position coordinates of the workpiece 6 (coordinates of a movement position of the end effector 5) and position coordinates on an image displayed on a screen.

The manipulator 1 is made up of three arms, and moves the end effector 5 to a desired position by means of an angle formed between the two arms and rotation of a fulcrum of the arm.

Figure 2:
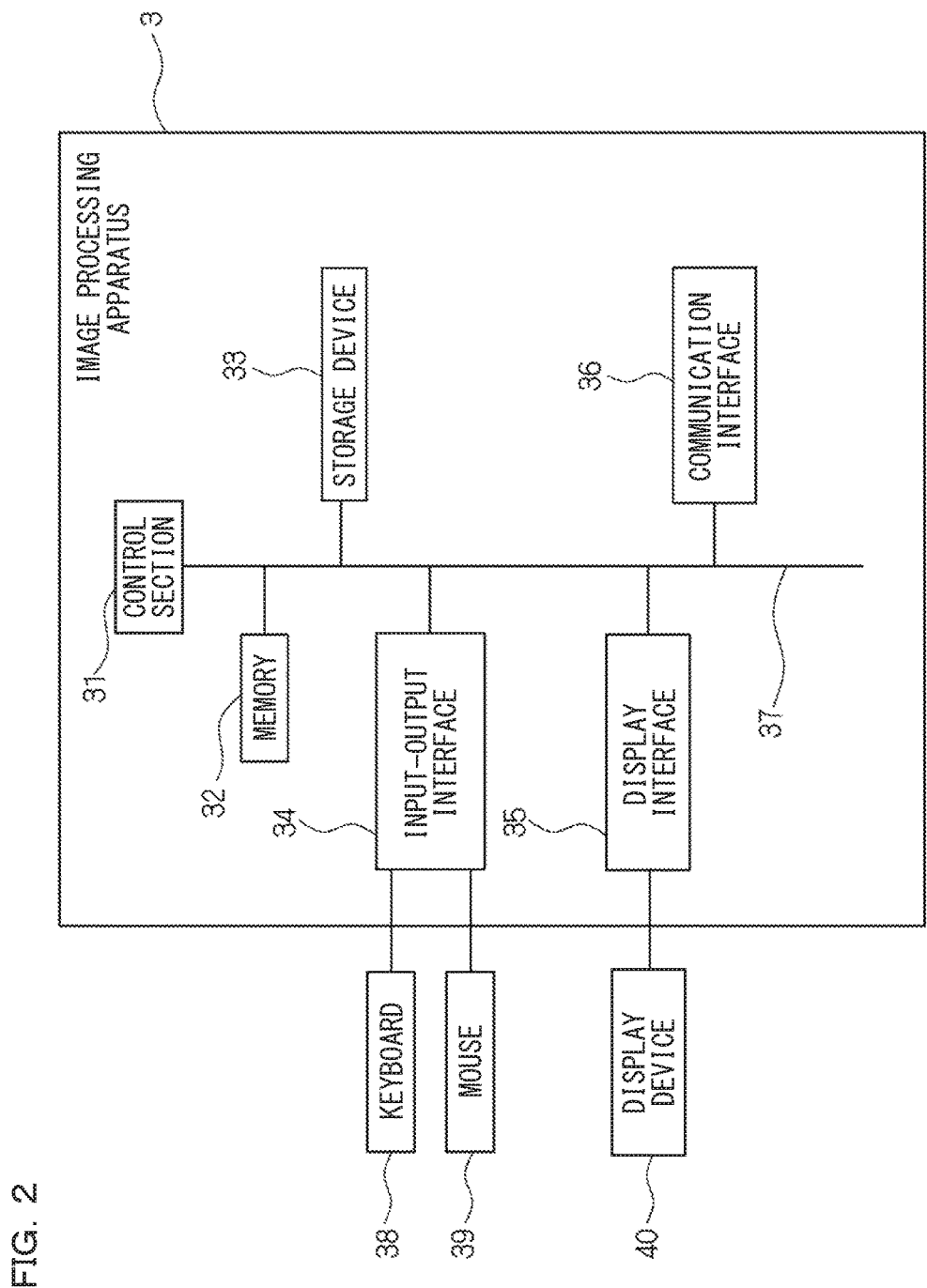
FIG. 2 is a block diagram showing a configuration example of an image processing apparatus in the image processing system according to the first embodiment of the present invention.

FIG. 2 is a block diagram showing a configuration example of the image processing apparatus 3 in the image processing system according to the first embodiment of the present invention. The image processing apparatus 3 according to the first embodiment of the present invention at least includes a control section 31 made up of a CPU (central processing unit) and the like, a memory 32, a storage unit 33, an input-output interface 34, a display interface 35, a communication interface 36, and an internal bus 37 for connecting the foregoing hardware.

The control section 31 is connected with each of the hardware of the image processing apparatus 3 as described above through the internal bus 37. While controlling an operation of each of the foregoing hardware, the control section 31 executes a variety of software functions in accordance with a computer program stored in the storage unit 33. The memory 32 is made up of a volatile memory such as an SRAM or an SDRAM. At the time of executing the computer program, a load module is developed to the memory 32, to store temporal data or the like generated at the time of executing the computer program.

The storage unit 33 is made up of a fixed-type storage device (hard disk) built therein, a volatile memory such as an SRAM, a nonvolatile memory such as a ROM, and the like. The computer program stored in the storage unit 33 is downloaded from a portable record medium such as a DVD or a CD-ROM in which information of a program and data is recorded, or is downloaded through the communication interface 36. At the execution time, the computer program is developed from the storage unit 33 to the memory 32 to be executed.

The communication interface (communication device) 36 is connected to the internal bus 37. By being connected by an external network such as the Internet, a LAN or a WAN, the communication interface 36 can transmit and receive data to and from an external computer or the like.

The input-output interface 34 is connected to data input mediums such as a keyboard 38 and a mouse 39, and accepts input of the data. Further, the display interface 35 is connected to a display device 40 such as a CRT monitor or an LCD, and displays a predetermined image.

The motion of the manipulator 1 has hitherto been controlled by a sequential motion control program stored in the robot controller 2. In that case, it is necessary to execute calibration between actual position coordinates of the end effector 5 of the manipulator 1 and position coordinates on an image displayed on the image processing apparatus 3.

In the calibration, a conversion formula between the actual position coordinates of the end effector 5 of the manipulator 1 and the position coordinates on the image displayed on the image processing apparatus 3 is calculated for each of a plurality of position coordinates. A method for the coordinate conversion is not particularly restricted, and for example, affine transformation is used for the conversion.

[Mathematical Formula 1]

$$\begin{pmatrix} x' \\ y' \\ 1 \end{pmatrix} = \begin{pmatrix} a & b & c \\ d & e & f \\ 0 & 0 & 1 \end{pmatrix} \times \begin{pmatrix} x \\ y \\ 1 \end{pmatrix}$$
$$x' = ax + by + c$$
$$y' = dx + ey + f$$

(Formula 1)

As shown in (Formula 1), based on actual position coordinates (x', y') of the end effector 5 of the manipulator 1 and position coordinates (x, y) on the image displayed on the image processing apparatus 3, coefficients a, b, c, d, e, f of the conversion formula, having six degrees of freedom, are obtained. When the number of corresponding position coordinates exceeds six, a least-squares method is used.

Figure 3:
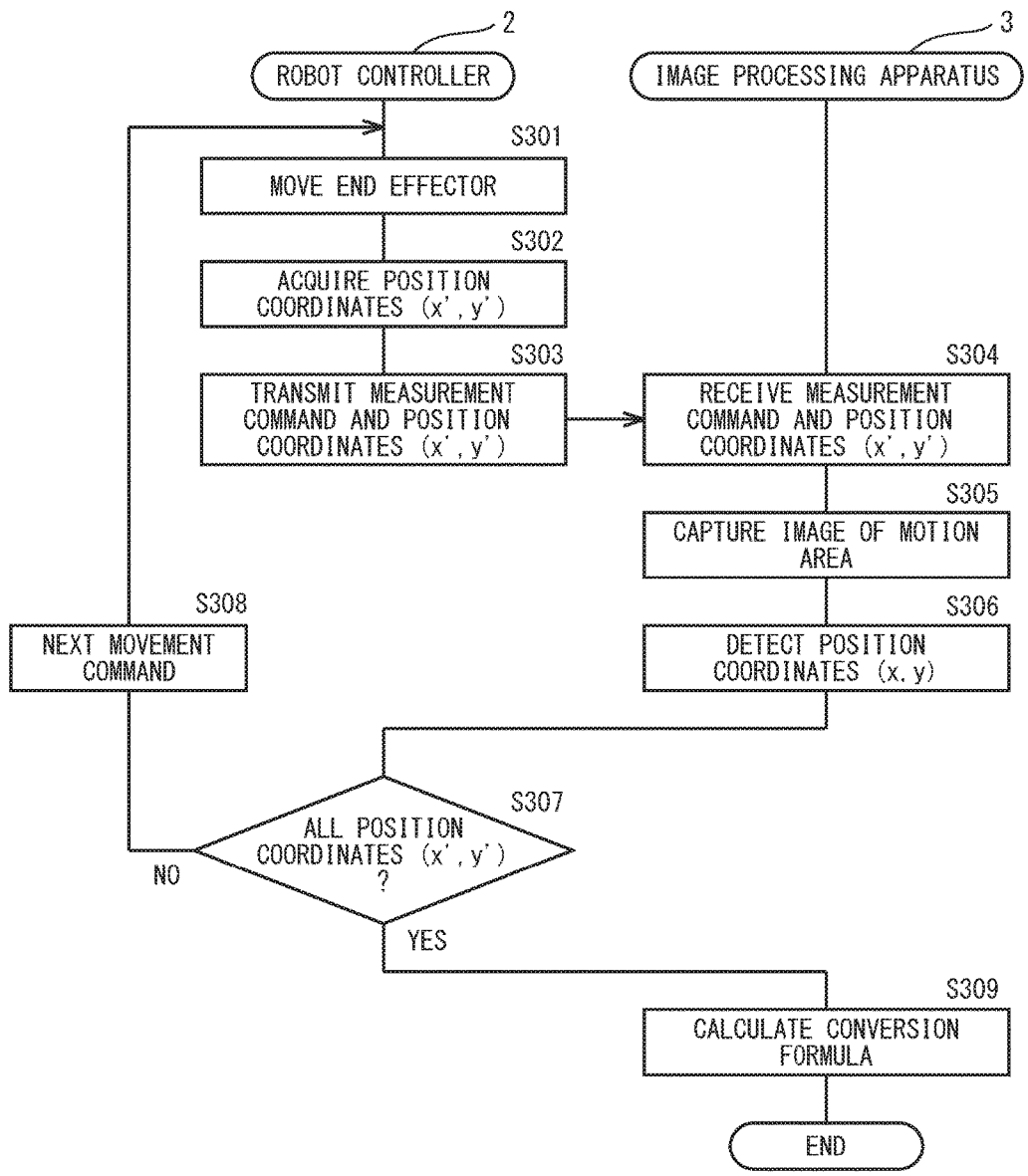
FIG. 3 is a flowchart showing a processing procedure for conventional calibration.

FIG. 3 is a flowchart showing a processing procedure for conventional calibration. As shown in FIG. 3, while the workpiece 6 provided with a mark to become an imaging target is grasped as a calibration target by the manipulator 1, the robot controller 2 moves the end effector 5 to a calibration position (Step S301).

The robot controller 2 acquires position coordinates (x', y') of the moved end effector 5 (Step S302), and transmits a measurement command and the acquired position coordinates (x', y') to the image processing apparatus 3 (Step S303). The image processing apparatus 3 receives the measurement command and the acquired position coordinates (x', y') from the robot controller 2 (Step S304), and captures an image of a motion area of the end effector 5 (Step S305).

The image processing apparatus 3 displays the image of the motion area of the end effector 5, and detects position coordinates (x, y) on the displayed image (Step S306). The robot controller 2 determines whether or not the position coordinates (x, y) on the image have been detected for all of the position coordinates (x', y') for calibration (Step S307). When the robot controller 2 determines that the position coordinates (x, y) on the image have not been detected for all of the position coordinates (x', y') (Step S307: NO), the robot controller 2 issues the next movement command (Step S308), and returns the processing to Step S301, to repeat the foregoing processing.

When the robot controller 2 determines that the position coordinates (x, y) on the image have been detected for all of the position coordinates (x', y') (Step S307: YES), the image processing apparatus 3 calculates a conversion formula in accordance with (Formula 1) (Step S309). Specifically, the six coefficients a, b, c, d, e, f are obtained.

However, the conventional calibration requires a sequential control program which is unique for each type of the manipulator 1. Hence the calibration should be executed using an individual control program for each type. Accordingly, the image processing apparatus 3 executes main calibration.

Figure 4:
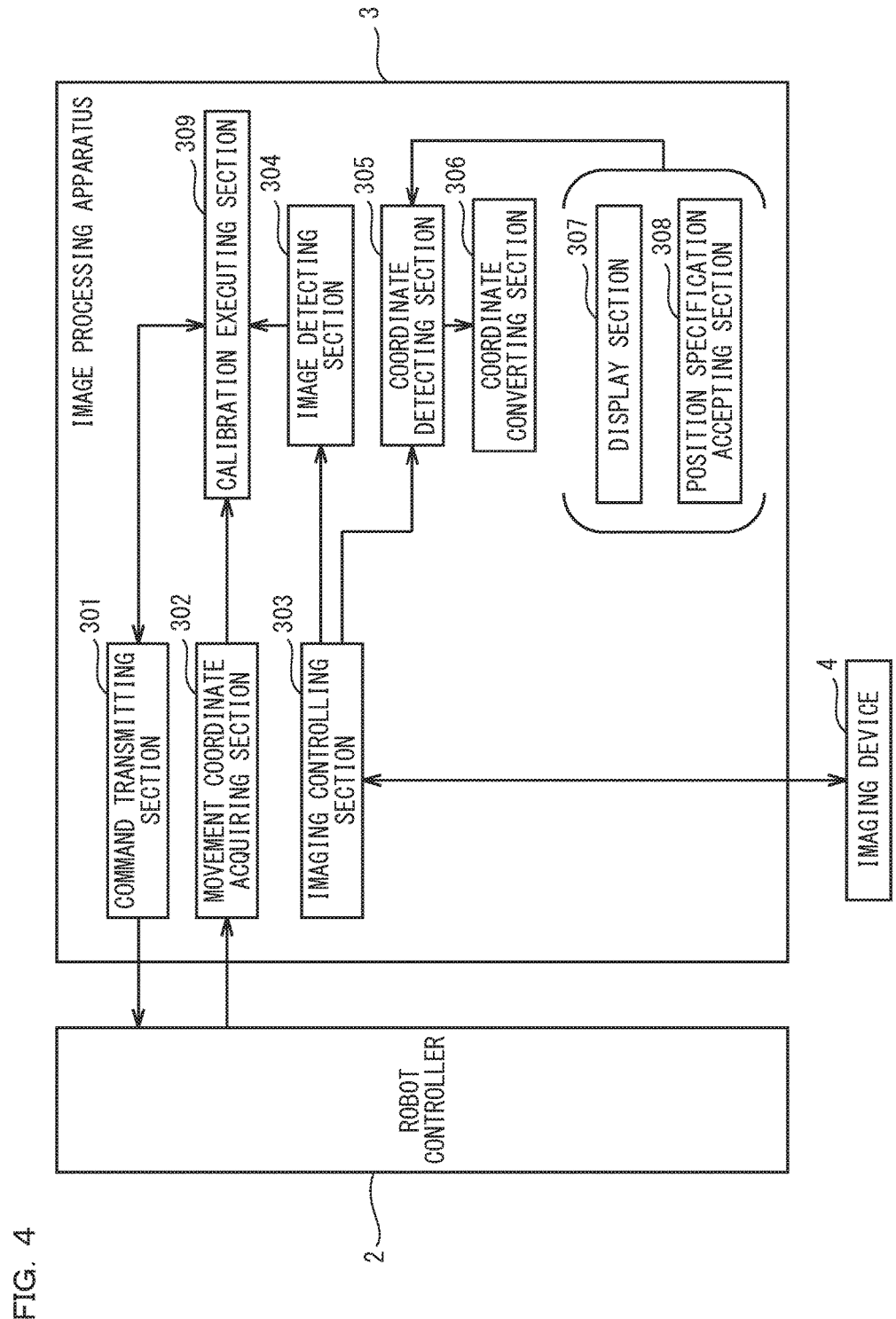
FIG. 4 is a functional block diagram of the image processing apparatus according to the first embodiment of the present invention.

FIG. 4 is a functional block diagram of the image processing apparatus 3 according to the first embodiment of the present invention. A command transmitting section 301 of the image processing apparatus 3 transmits, to the robot controller 2, a movement command to move the end effector 5 to a plurality of predetermined positions, so as to change a relative position of the target, which becomes an imaging target, with respect to the imaging device 4.

The command transmitting section 301 transmits the movement command to the robot controller 2, the command including at least a movement instruction and position coordinates of a movement destination. The robot controller 2 moves the end effector 5 to the position coordinates included in the movement command.

A movement coordinate acquiring section 302 acquires, from the robot controller 2, first coordinate values (x', y') that are each position coordinates of the end effector 5 moved in accordance with the movement command. This can adjust displacement between the position coordinates of the moved end effector 5 and the position coordinates on the captured image of the target 6.

It is to be noted that the first coordinate values (x', y') acquired in the movement coordinate acquiring section 302 are coordinate values acquired from the robot controller 2 at each position to which the end effector 5 has moved in accordance with the movement command from the image processing apparatus 3. However, targeted movement coordinates of the manipulator (robot) 1 set in advance in the image processing apparatus 3 may be used as they are as the first coordinate values.

An imaging controlling section 303 controls an operation of the imaging device 4 so as to capture an image of the target at each movement destination, to which the end effector 5 has moved. Thus, the control is performed so as to capture an image of an area corresponding to the first coordinate values (x', y') that are the position coordinates of the end effector 5 at the movement destination acquired from the robot controller 2, thereby enabling detection of the second coordinate values (x, y) being actual position coordinates of the target 6 based on the captured image.

An image detecting section 304 detects the second coordinate values (x, y) being position coordinates of the target based on the image of the target 6 captured at each movement destination. Based on the plurality of acquired first coordinate values (x', y') and the plurality of detected second coordinate values (x, y), a calibration executing section 309 calculates a conversion rule between both of the coordinates.

Specifically, coordinate values are substituted into (Formula 1), to obtain the coefficients a, b, c, d, e, f.

Figure 5:
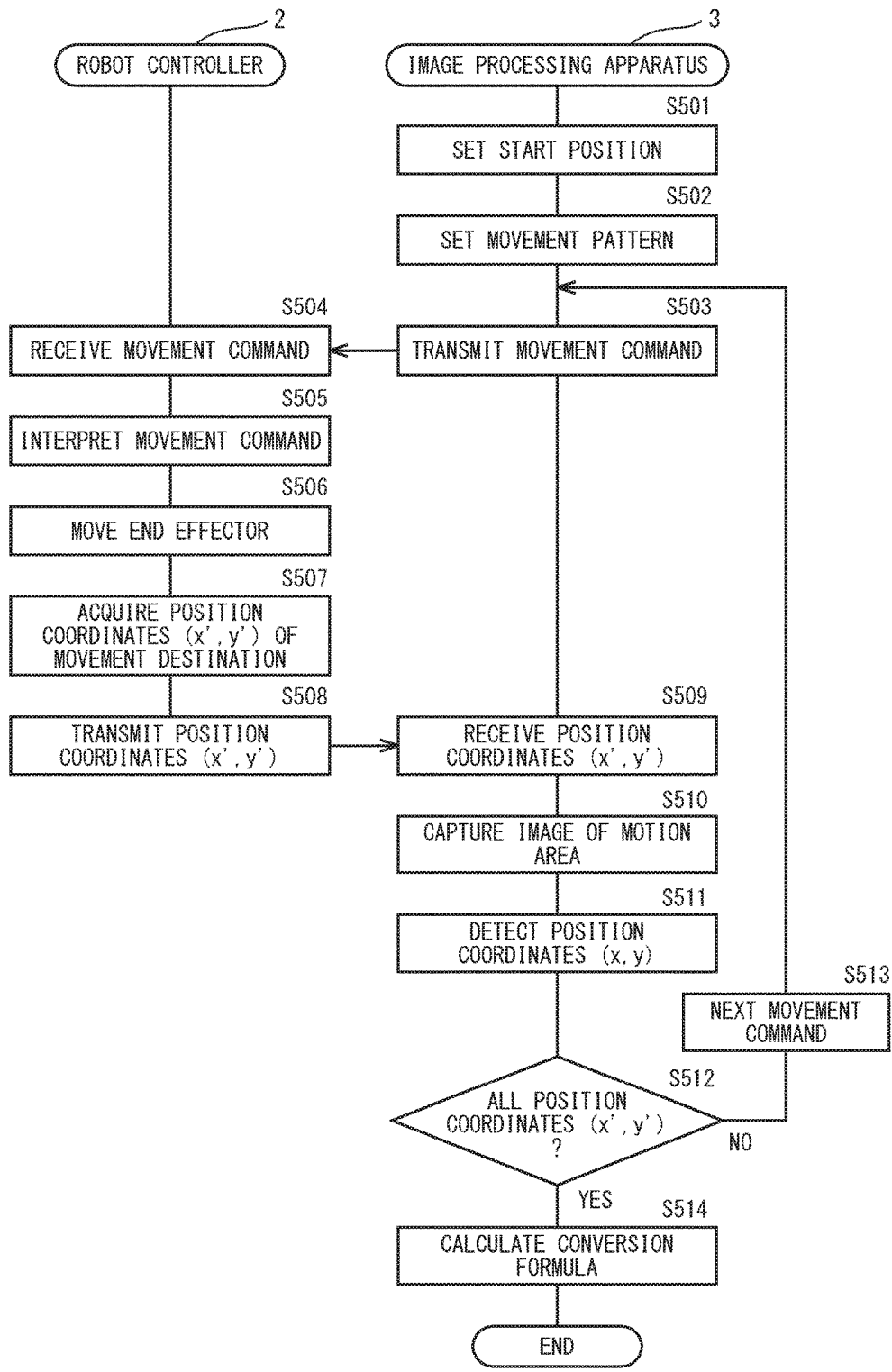
FIG. 5 is a flowchart showing a processing procedure for calibration of the image processing system according to the first embodiment of the present invention.
Figure 6:
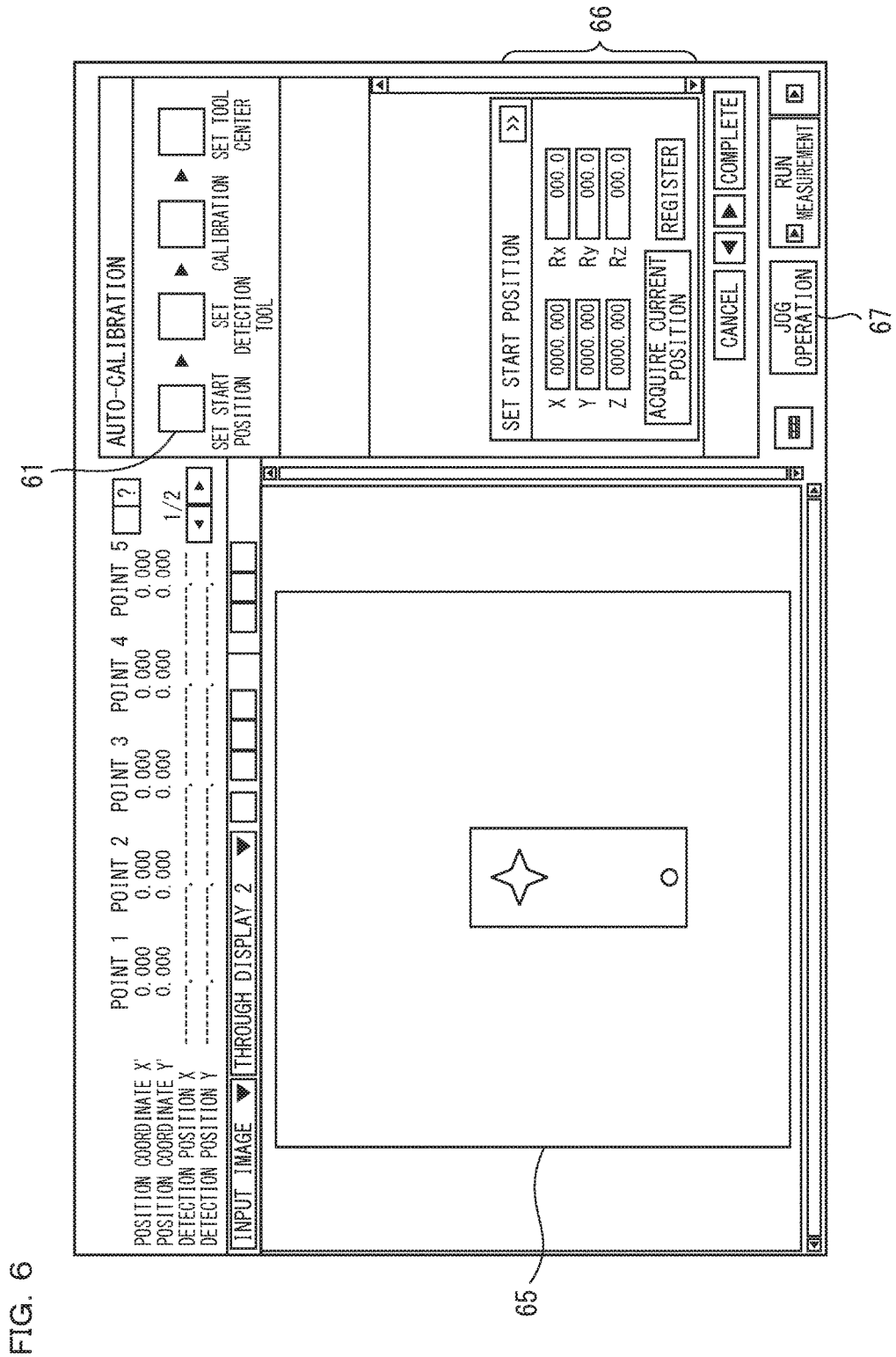
FIG. 6 is an illustrative view of a start position setting screen of the image processing apparatus according to the first embodiment of the present invention.

FIG. 5 is a flowchart showing a processing procedure for calibration of the image processing system according to the first embodiment of the present invention. As shown in FIG. 5, while the workpiece 6 which is provided with a mark to become an imaging target is grasped as a calibration target by the manipulator 1, the image processing apparatus 3 sets a start position of the calibration (Step S501). FIG. 6 is an illustrative view of a start position setting screen of the image processing apparatus 3 according to the first embodiment of the present invention.

As shown in FIG. 6, the captured image of the target 6 is displayed in an image display area 65. When a start position setting button 61 is selected out of calibration execution buttons, a start position setting screen 66 is popped up, and a start position is set. In this case, selecting a jog operation button 67 allows the end effector 5 of the manipulator 1 to move to a predetermined position. Hence the start position of the calibration can be set while the movement destination is checked.

Figure 7:
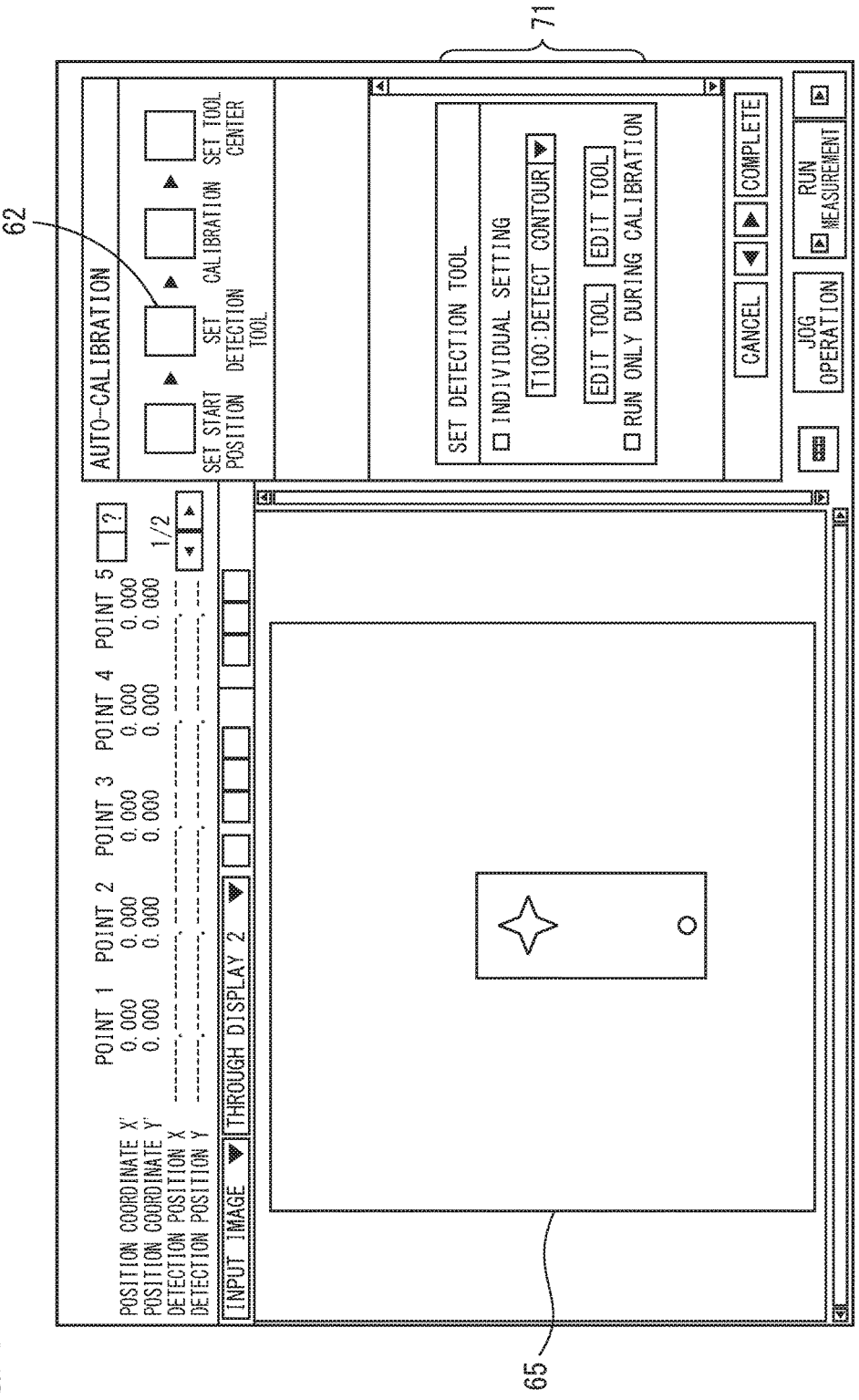
FIG. 7 is an illustrative view of a detection tool setting screen of the image processing apparatus according to the first embodiment of the present invention.

It is to be noted that a detection tool can be set before a movement pattern is set. FIG. 7 is an illustrative view of a detection tool setting screen of the image processing apparatus 3 according to the first embodiment of the present invention.

As shown in FIG. 7, when a detection tool setting button 62 is selected out of the calibration execution buttons, a detection tool selecting area 71 is displayed. The user selects a detection tool in the detection tool selecting area 71, while viewing the image displayed in the image display area 65. In the example of FIG. 7, a contour detection tool has been selected. Other than this, for example, a shading detection tool may be selected.

Figure 8:
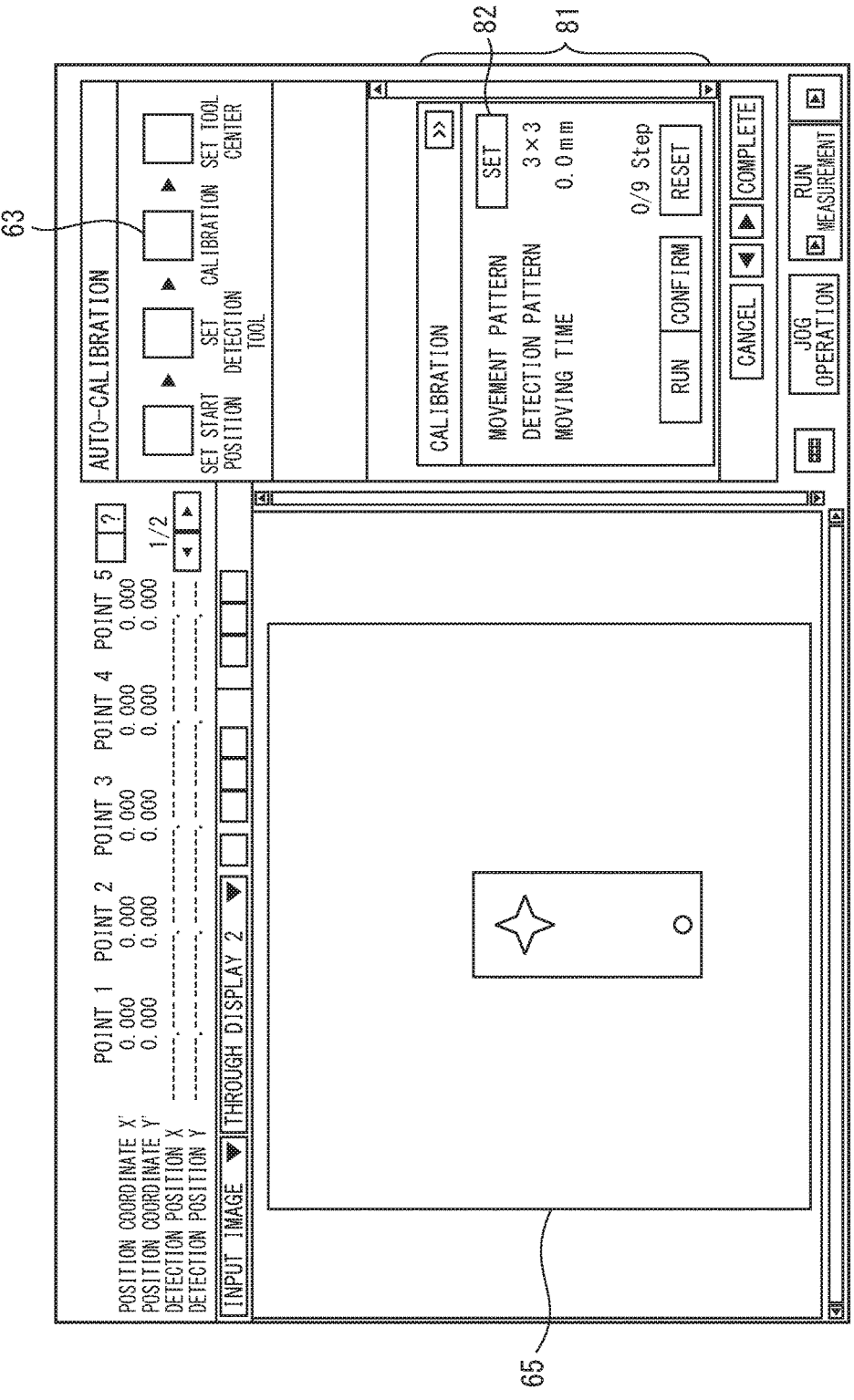
FIG. 8 is an illustrative view of a movement pattern setting screen of the image processing apparatus according to the first embodiment of the present invention.
Figure 9:
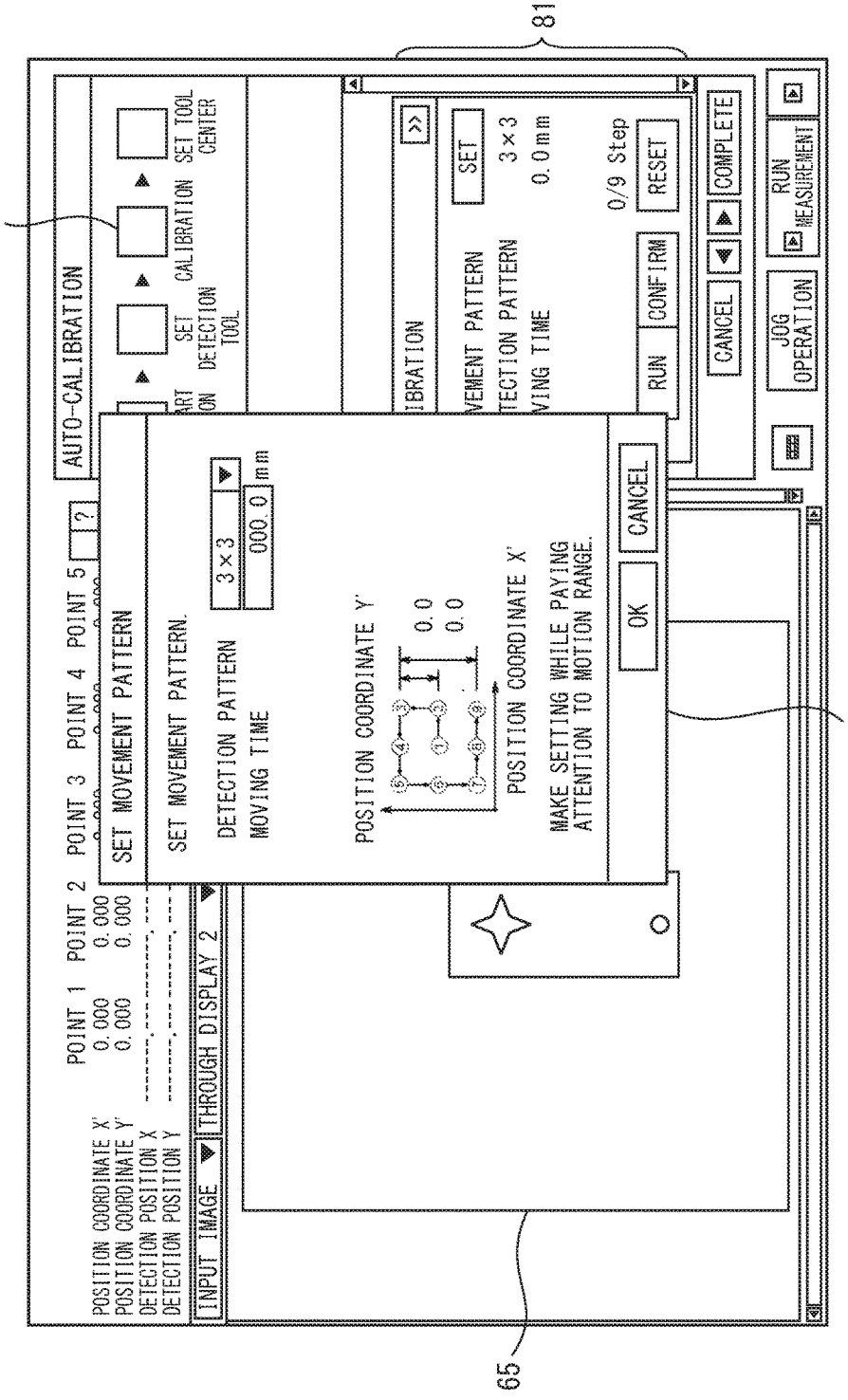
FIG. 9 is an illustrative view of the movement pattern setting screen of the image processing apparatus according to the first embodiment of the present invention.

Returning to FIG. 5, the image processing apparatus 3 sets a movement pattern of the end effector 5 of the manipulator 1 (Step S502). FIGS. 8 and 9 are illustrative views of a movement pattern setting screen of the image processing apparatus 3 according to the first embodiment of the present invention.

As shown in FIG. 8, when a calibration button 63 is selected out of the calibration execution buttons, a movement pattern setting screen 81 is popped up. When a movement pattern setting button 82 is herein selected, a detail setting screen 83 is popped up as shown in FIG. 9.

On the detail setting screen 83, a detection pattern at the time of executing the calibration is set. For example, nine (3×3) settings, 25 (5×5) settings or other settings are accepted. A predetermined movement distance is set, thereby to set a movement pattern as displayed in a lower portion of the detail setting screen 83.

Returning to FIG. 5, the image processing apparatus 3 transmits a movement command to the robot controller 2 (Step S503). The robot controller 2 receives the movement command (Step S504), and interprets the movement command in accordance with the type of the manipulator 1 (Step S505). That is, the command is translated to a load module in machine language that can activate the manipulator 1.

The robot controller 2 moves the end effector 5 to a position specified by the movement command (Step S506). The robot controller 2 acquires position coordinates (x', y') of the movement destination of the moved end effector 5 (Step S507), and transmits the acquired position coordinates (x', y') to the image processing apparatus 3 (Step S508).

The image processing apparatus 3 receives the acquired position coordinates (x', y') from the robot controller 2 (Step S509), and captures an image of a motion area of the end effector 5 (Step S510). The image processing apparatus 3 displays the image of the motion area, and detects position coordinates (x, y) on the displayed image (Step S511).

It should be noted that the position coordinates (x, y) of which position on the displayed image are to be detected are set from the image by use of the set detection tool. For example, when the contour detection tool has been selected as the detection tool, a contour area to be detected needs to be specified.

Figure 10:
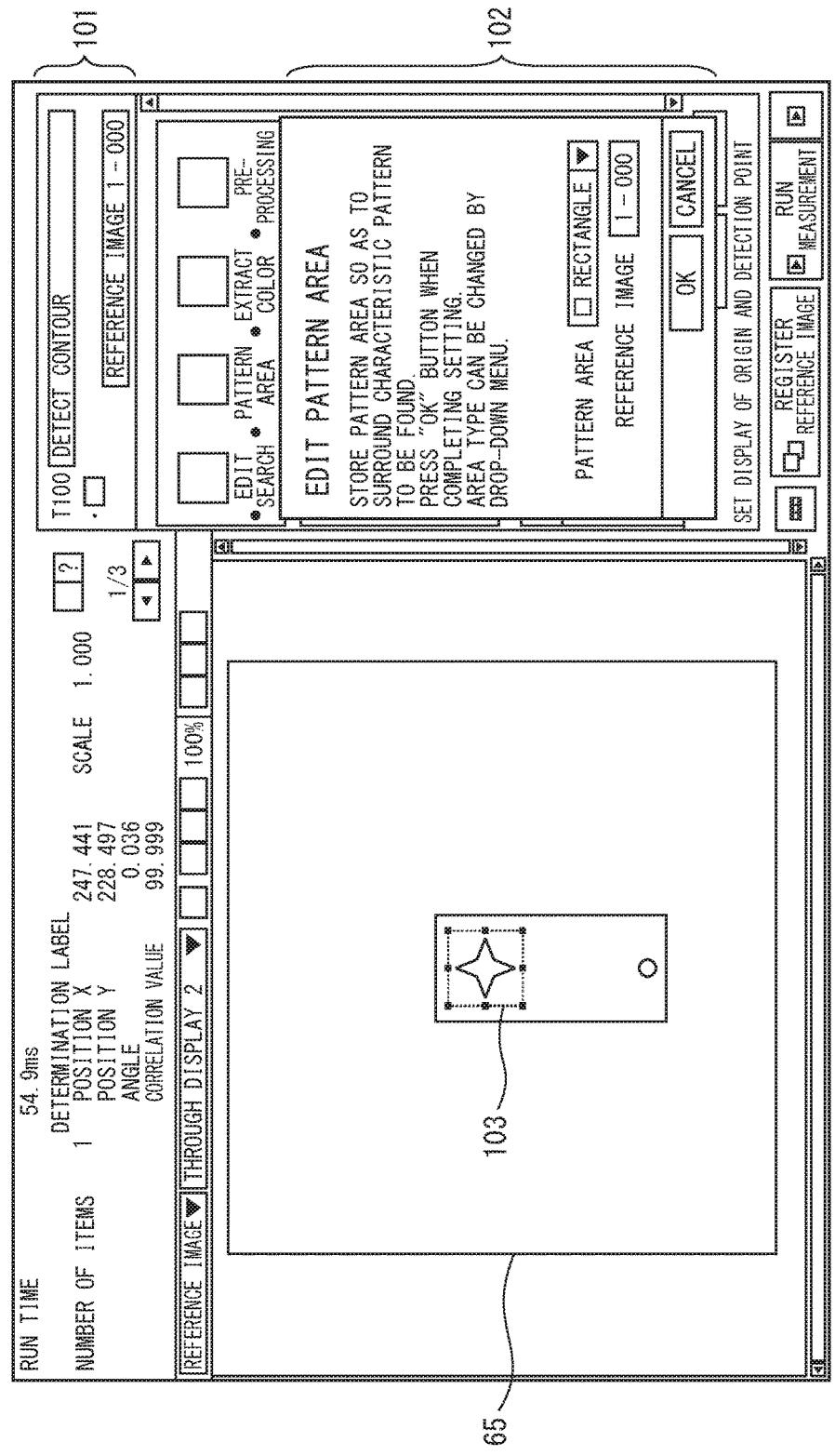
FIG. 10 is an illustrative view of a detection condition setting screen of the image processing apparatus according to the first embodiment of the present invention in the case of using a contour detection tool.
Figure 11:
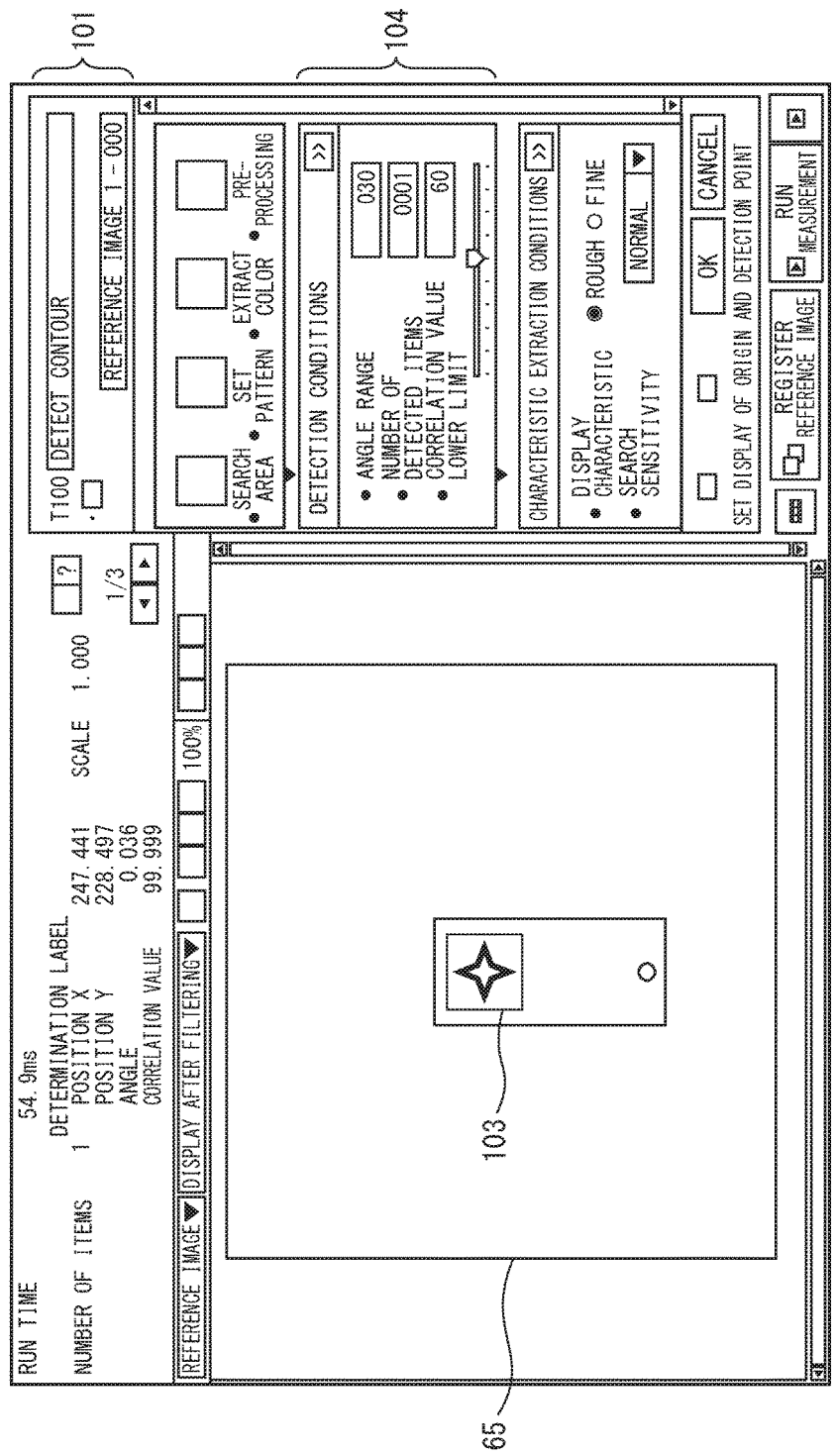
FIG. 11 is an illustrative view of the detection condition setting screen of the image processing apparatus according to the first embodiment of the present invention in the case of using the contour detection tool.

FIGS. 10 and 11 are illustrative views of a detection condition setting screen of the image processing apparatus 3 according to the first embodiment of the present invention in the case of using the contour detection tool. As shown in FIG. 10, the selected "contour detection tool" is displayed in a tool display area 101. Then, a shape of a contour pattern is set in a pattern editing area 102. In the example of FIG. 10, it has been set to a rectangular area.

Then, for the target displayed in the image display area 65, a detection area 103 for detecting a contour pattern is set while a drag operation is performed using the mouse or the like. In the example of FIG. 10, the area is set so as to surround the target, but the setting is not particularly restricted to such a setting.

When the detection area 103 is set, as shown in FIG. 11, detection conditions are set on a detection condition setting screen 104. Examples of the detection conditions include an "angle range" that is a permissible range of inclination of the target, the "number of detected items" showing the number of items to be detected, and a "correlation value lower limit" showing the degree of similarity to which the detection is performed.

Further, the shading detection tool may be selected as the detection tool. Even when the shading detection tool has been selected, the area to be detected needs to be set.

Figure 12:
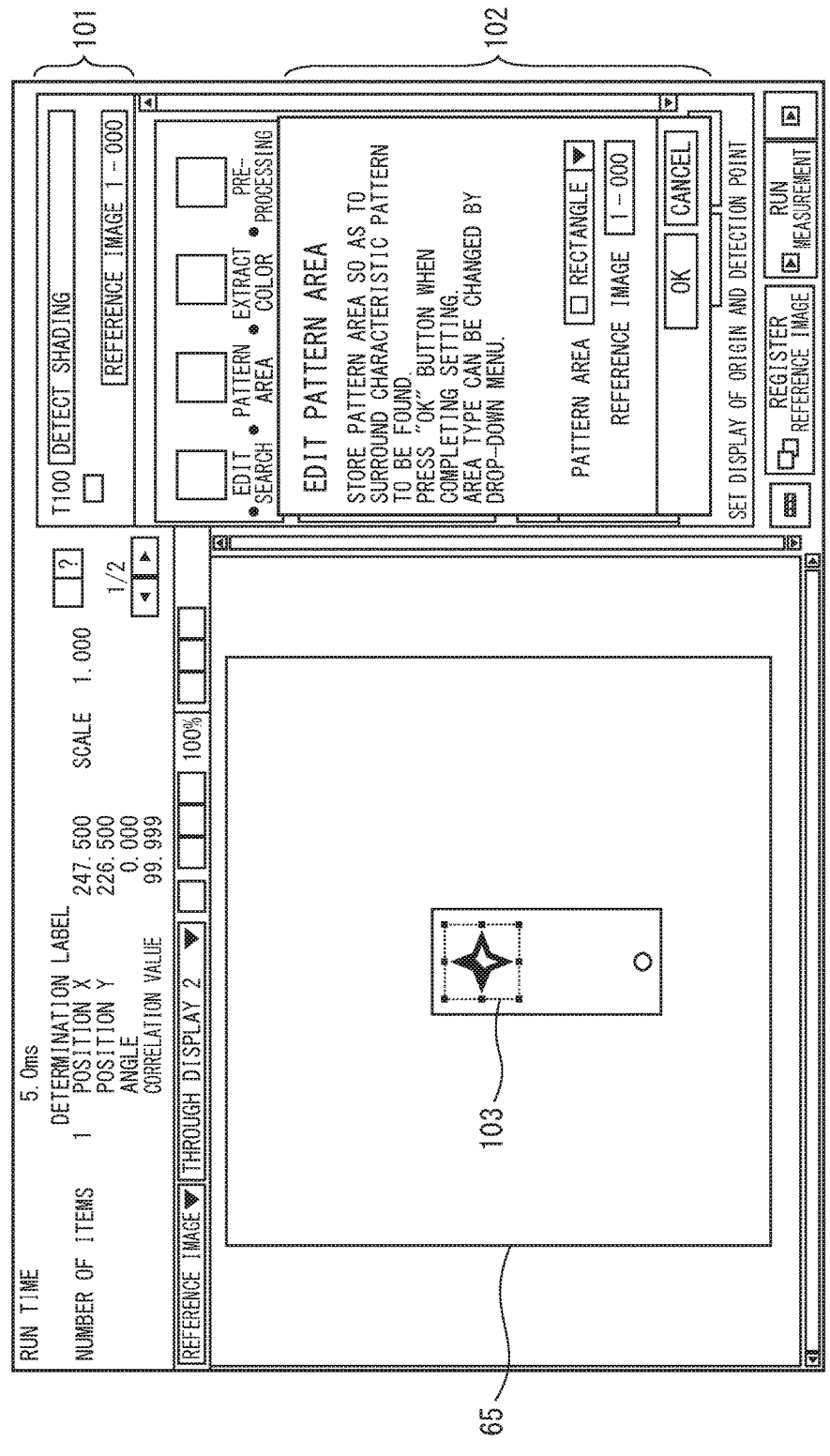
FIG. 12 is an illustrative view of the detection condition setting screen of the image processing apparatus according to the first embodiment of the present invention in the case of using a shading detection tool.
Figure 13:
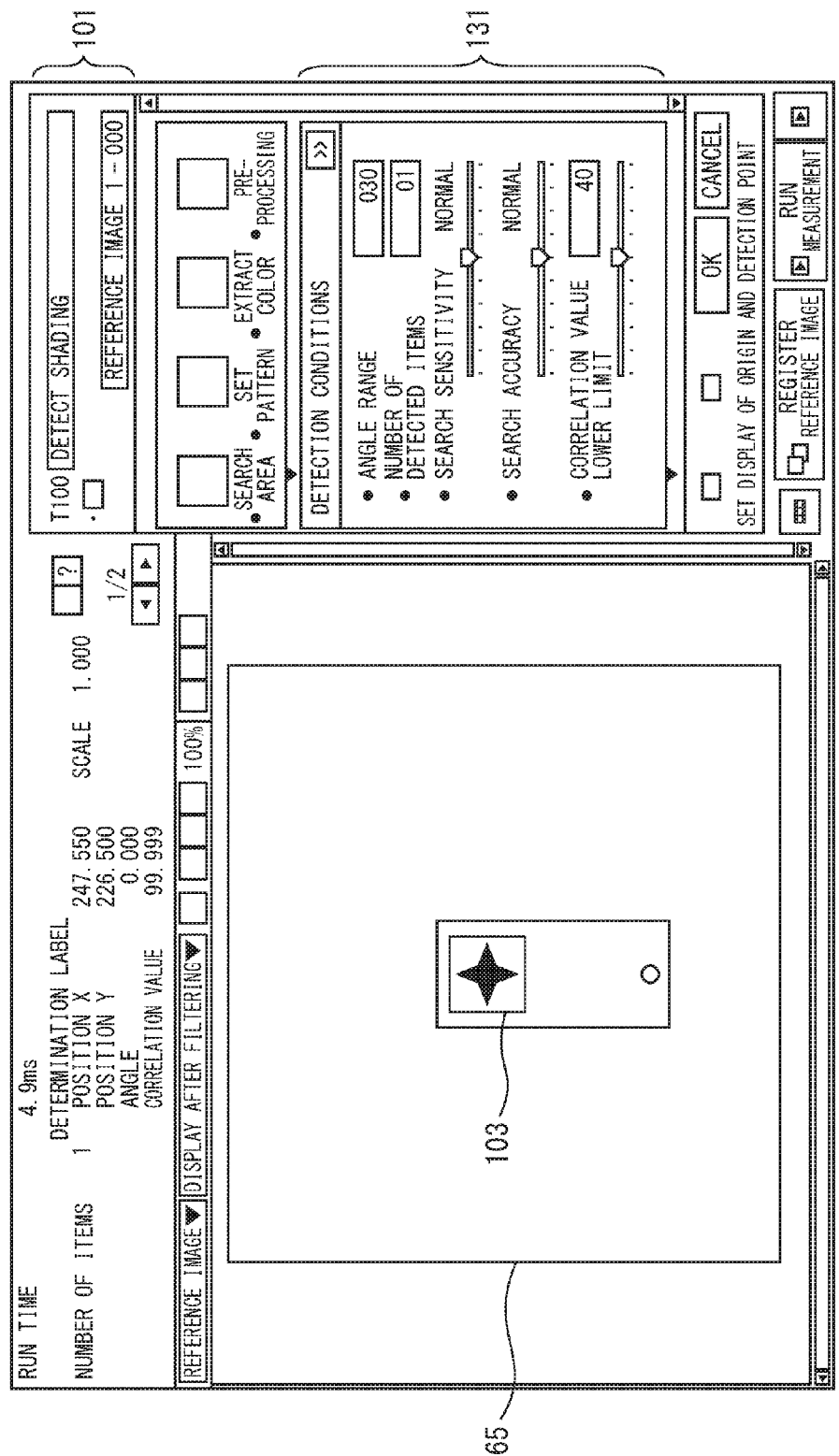
FIG. 13 is an illustrative view of the detection condition setting screen of the image processing apparatus according to the first embodiment of the present invention in the case of using the shading detection tool.

FIGS. 12 and 13 are illustrative views of the detection condition setting screen of the image processing apparatus 3 according to the first embodiment of the present invention in the case of using the shading detection tool. As shown in FIG. 12, the selected "shading detection tool" is displayed in the tool display area 101. Then, a shape of a contour pattern is set in a pattern editing area 102. In the example of FIG. 12, it has been set to a rectangular area.

Then, for the target displayed in the image display area 65, a detection area 103 for detecting a contour pattern is set while a drag operation is performed using the mouse or the like. In the example of FIG. 12, the area has been set so as to surround the target, but the setting is not particularly restricted to such a setting.

When the detection area 103 is set, as shown in FIG. 13, detection conditions are set in a detection condition setting area 131. Examples of the detection conditions include the "angle range" that is the permissible range of inclination of the target, the "number of detected items" showing the number of items to be detected, and the "correlation value lower limit" showing the degree of similarity to which the detection is performed, and other than those, it is also possible to set a detection sensitivity (search sensitivity) or detection accuracy (search accuracy). This is because there is assumed a case in which a shading difference or the like is different while the shape is the same.

Returning to FIG. 5, the image processing apparatus 3 determines whether or not the position coordinates (x, y) on the image have been detected for all of the position coordinates (x', y') for calibration (Step S512). When the image processing apparatus 3 determines that the position coordinates (x, y) on the image have not been detected for all of the position coordinates (x', y') (Step S512: NO), the image processing apparatus 3 issues the next movement command (Step S513) and returns the processing to Step S503, to repeat the foregoing processing.

When the image processing apparatus 3 determines that the position coordinates (x, y) on the image have been detected for all of the position coordinates (x', y') (Step S512: YES), the image processing apparatus 3 calculates a conversion formula in accordance with (Formula 1) (Step S514). Specifically, the six coefficients a, b, c, d, e, f are obtained.

Figure 14:
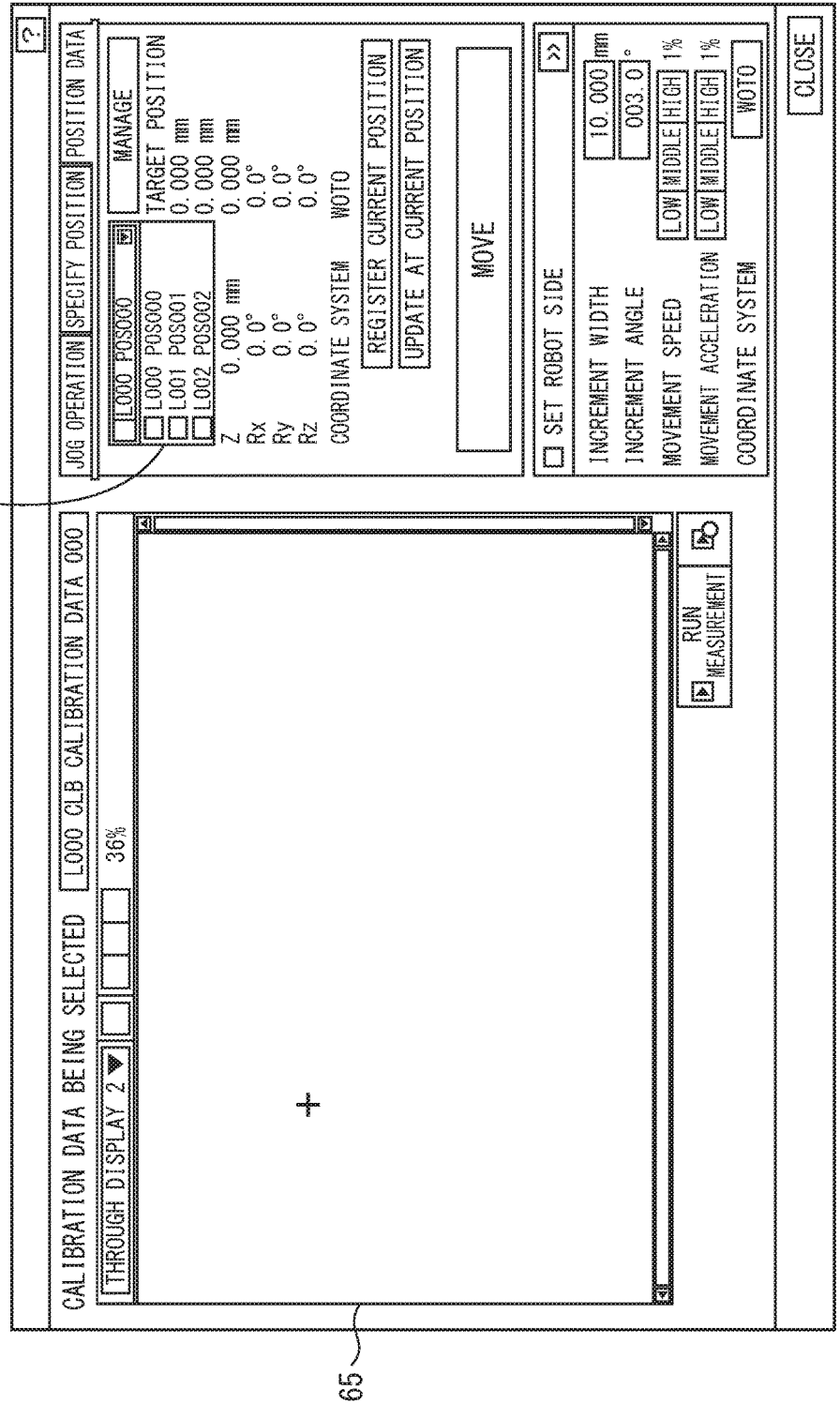
FIG. 14 is an illustrative view of a movement destination selecting screen of the image processing apparatus according to the first embodiment of the present invention.

It is to be noted that the method of specifying a movement destination by a movement command is not particularly restricted. For example, it may be a method of storing a plurality of movement destinations in advance and selecting one therefrom. FIG. 14 is an illustrative view of a movement destination selecting screen of the image processing apparatus 3 according to the first embodiment of the present invention. As shown in FIG. 14, candidates for the movement destination, which are already stored, are displayed in a movement destination selecting area 141. The user selects one movement destination from these candidates.

Figure 15:
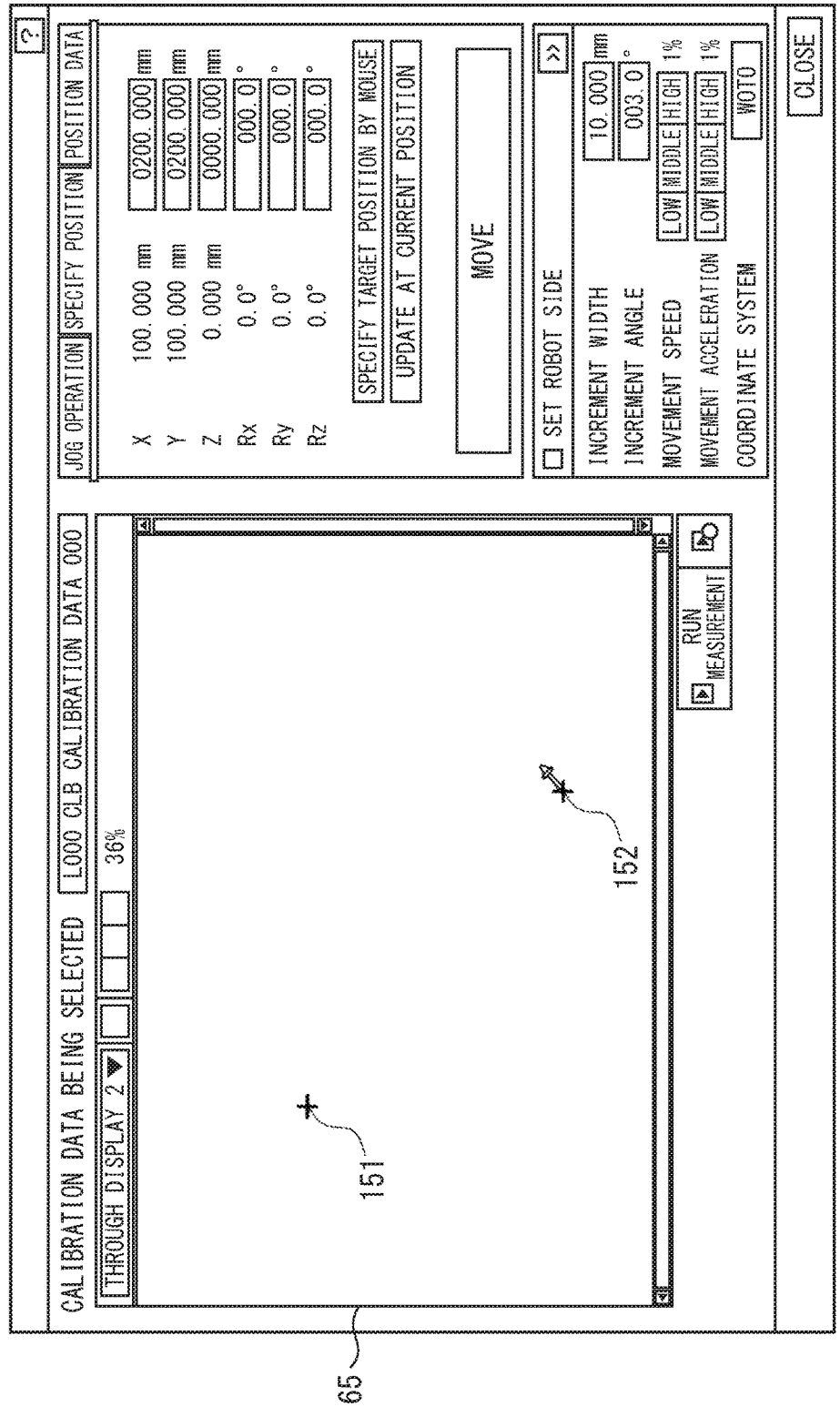
FIG. 15 is another illustrative view of the movement destination selecting screen of the image processing apparatus according to the first embodiment of the present invention.

Further, the position may be specified on the displayed screen. FIG. 15 is another illustrative view of the movement destination selecting screen of the image processing apparatus 3 according to the first embodiment of the present invention. In the example of FIG. 15, the movement destination selecting area 141 is not present. In the image display area 65 where the captured image is simply displayed, a current position is displayed with a "cross" mark 151. The user specifies a position "cross" mark 152 as a movement destination by a click operation of the mouse or the like.

In this case, on the assumption that the coefficients a, b, c, d, e, f of (Formula 1) are specified by execution of the calibration, it is necessary to provide a coordinate detecting section 305, a coordinate converting section 306, a display section 307, and a position specification accepting section 308 in FIG. 4.

The coordinate detecting section 305 detects the second coordinate values (x, y) being actual position coordinates of the target 6 based on the captured image of the target 6. Then, the coordinate converting section 306 converts the detected second coordinate values (x, y) to the first coordinate values (x', y') based on the conversion rule.

The display section 307 displays the captured image of the target 6, and the position specification accepting section 308 accepts specification of the position on the displayed image of the target 6. This allows detection of the second coordinate values at the position, the specification of which has been accepted. Hence it is possible to issue a correct movement command to the end effector 5 of the manipulator 1, while viewing the displayed image.

Further, the position coordinates after movement may be superimposed and displayed on the displayed image of the target 6. That is, the first coordinate values acquired by the movement coordinate acquiring section 302 are converted to the second coordinate values based on the calculated conversion rule. The converted values are superimposed and displayed on the displayed image of the target 6.

Figure 16:
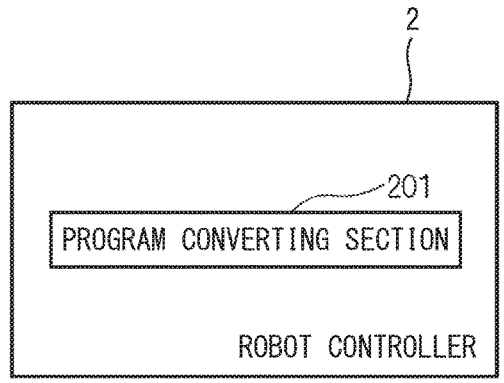
FIG. 16 is a functional block diagram of a robot controller according to the first embodiment of the present invention.

Moreover, the robot controller 2 needs to convert the movement command in accordance with the type of the manipulator (robot) 1 that controls the motion. FIG. 16 is a functional block diagram of the robot controller 2 according to the first embodiment of the present invention.

As shown in FIG. 16, the robot controller 2 is provided with a program converting section 201. The program converting section 201 is provided for each type of the manipulator (robot) 1, and converts the movement command to a movement command to the end effector 5 in accordance with the type of the manipulator 1. Hence it is possible to install a conversion program in accordance with the type of the manipulator 1 to be used in the robot controller 2, and convert the movement command to the movement command to the end effector 5 in accordance with the type of the manipulator 1.

Figure 17:
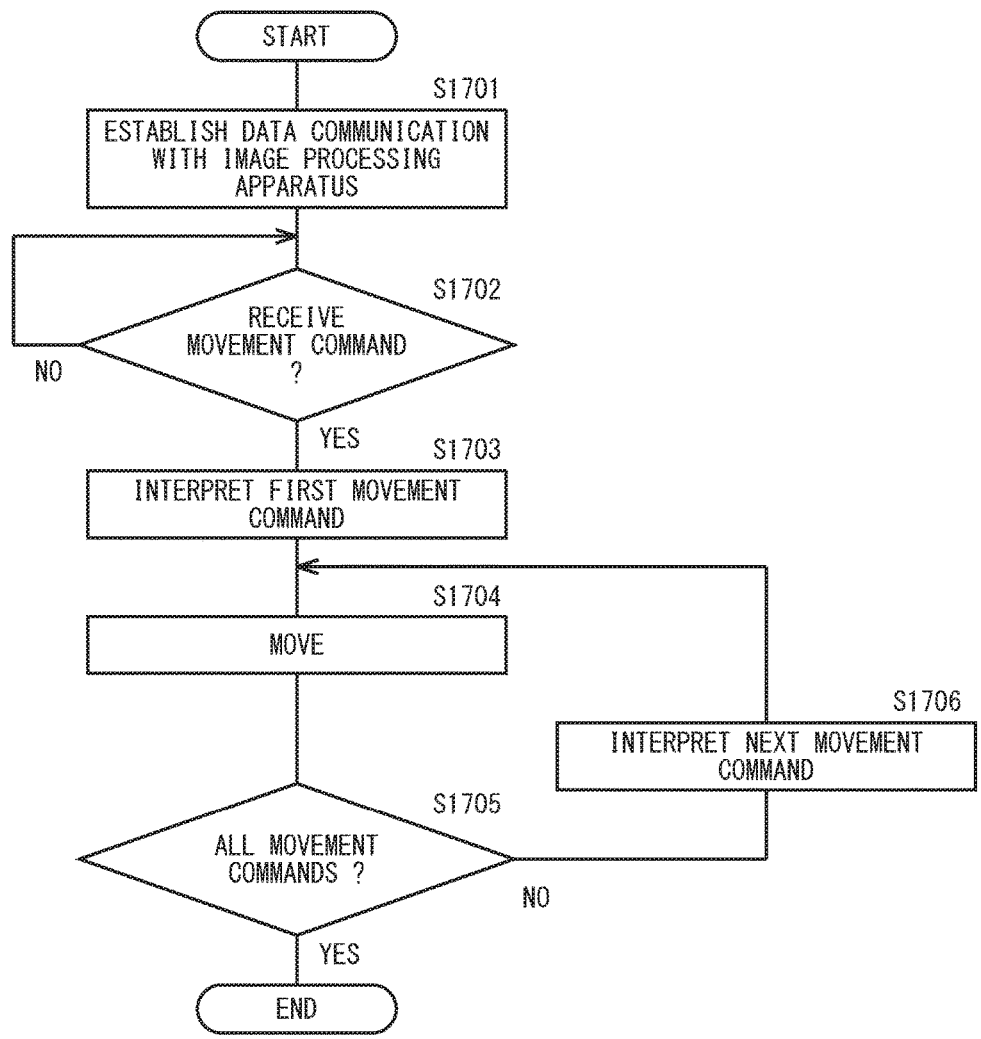
FIG. 17 is a flowchart showing a processing procedure for a conversion program for the robot controller according to the first embodiment of the present invention.

FIG. 17 is a flowchart showing a processing procedure for the conversion program for the robot controller 2 according to the first embodiment of the present invention. As shown in FIG. 17, the robot controller 2 establishes data communication with the image processing apparatus 3 (Step S1701), and determines whether or not the movement command has been received (Step S1702).

When determining that the movement command has not been received (Step S1702: NO), the robot controller 2 enters a reception standby state. When determining that the movement command has been received (Step S1702: YES), the robot controller 2 interprets the first movement command (Step S1703).

The robot controller 2 converts the movement command in accordance with contents of the interpreted movement command, and moves the end effector 5 of the manipulator 1 (Step S1704). The robot controller 2 determines whether or not to have interpreted all movement commands (Step S1705).

When determining that some movement command has not been interpreted (Step S1705: NO), the robot controller 2 interprets the next movement command (Step S1706), and returns the processing to Step S1704, to repeat the foregoing processing. When determining that all the movement commands have been interpreted (Step S1705: YES), the robot controller 2 ends the processing.

FIG. 18 is an illustrative view of the conversion program for the robot controller 2 according to the first embodiment of the present invention. As shown in FIG. 18, a source code 1801 is a command to establish data communication with the image processing apparatus 3.

A source code 1802 is a command to receive a movement command from the image processing apparatus 3. A source code 1803 is a command to interpret a movement command. With the source codes shown in FIG. 18, for example when a movement command [MV, 100, 200, 300] is received, an order code [MV] is detected and (100, 200, 300) are stored as positions of movement destinations. Preparing a conversion program tailored to a data structure of a movement command in this manner enables acceptance of the movement command from the outside.

Further, a data structure of a movement command typically varies in accordance with robot manufacturers. Therefore, a conversion program is prepared in advance for each robot manufacturer, and the conversion program in accordance with the robot manufacturer to be applied is installed into the robot controller 2. Thus, the robot controller 2 can convert a movement command in a common format transmitted from the image processing apparatus 3 to a movement command to the end effector 5 in accordance with the type of the robot.

It is to be noted that in the foregoing example, the movement command is written as a character string and transmitted through non-protocol communication of Ethernet (registered trademark). However, for example in a common memory of the robot controller 2, a command is allocated to an address AAA while a command parameter is allocated to an address BBB, to allow formation of a command system by exchange of numerical data with no use of a character string. When a movement command as numerical values are received from the image processing apparatus 3, the address AAA is rewritten by a numerical number corresponding to the movement command "MV" and the address BBB is replaced by "100, 200, 300", which are then issued as a movement command to the manipulator 1.

Naturally, a protocol communication other than this may be used, such as protocol communication of Ethernet (registered trademark), PLC-Link, CC-Link or PROFINET.

Figure 19:
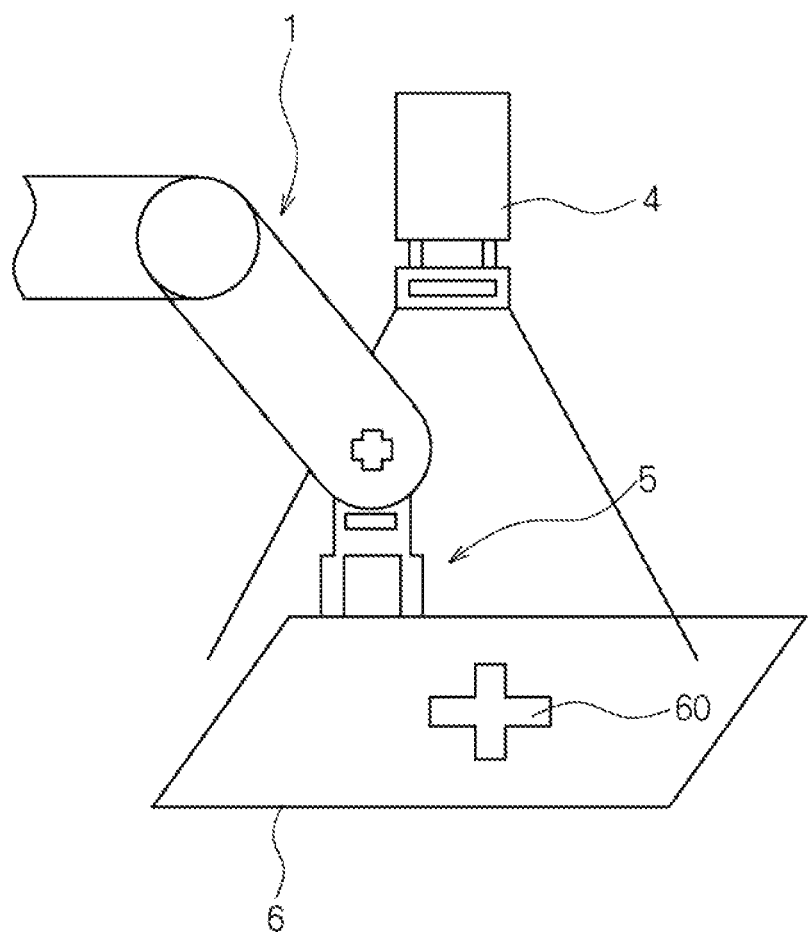
FIG. 19 is a schematic view showing a configuration of an off-hand type image processing system according to the first embodiment of the present invention.

Further, in the foregoing first embodiment, the imaging device 4 is assumed to be provided separately from the manipulator 1 (hereinafter referred to as "off-hand type"). FIG. 19 is a schematic view showing a configuration of an off-hand type image processing system according to the first embodiment of the present invention.

In FIG. 19, while the workpiece (target) 6 which is provided with a mark 60 to become an imaging target is grasped as a calibration target by the manipulator 1, the end effector 5 is moved and capturing the image is performed by the imaging device 4.

Figure 20A:
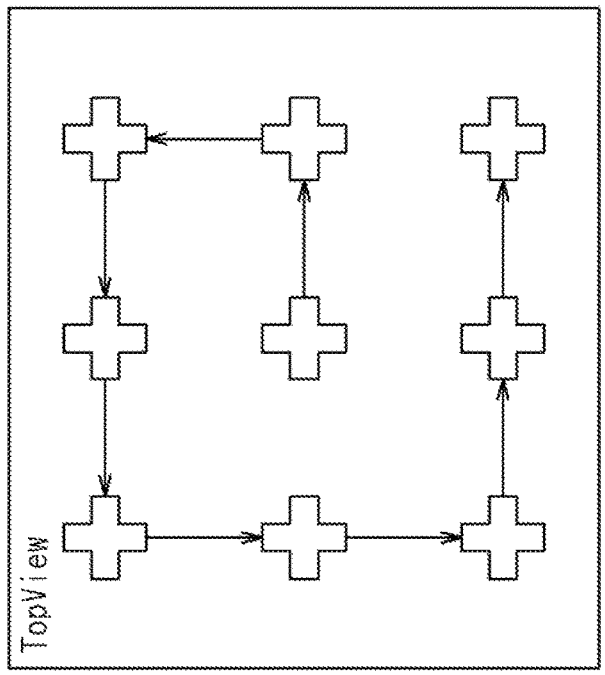
FIGS. 20A and 20B are schematic views showing imaging positions on the image processing apparatus in the off-hand type according to the first embodiment of the present invention.
Figure 20B:
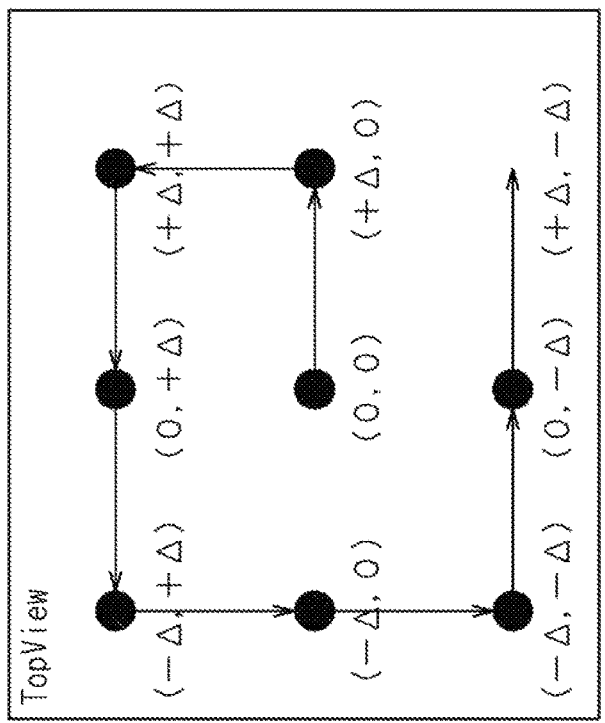

FIGS. 20A and 20B are schematic views showing imaging positions on the image processing apparatus 3 in the off-hand type according to the first embodiment of the present invention. FIG. 20A shows a movement sequence of the end effector 5, and the end effector 5 moves at regular intervals counterclockwise from the origin (0, 0). FIG. 20B shows a sequence in which an image of the mark 60 is captured by the imaging device 4. Since the imaging device 4 is provided fixedly and separately from the manipulator 1, the imaging device 4 captures the image at regular intervals counterclockwise from the origin (0, 0), as in FIG. 20A.

Figure 21:
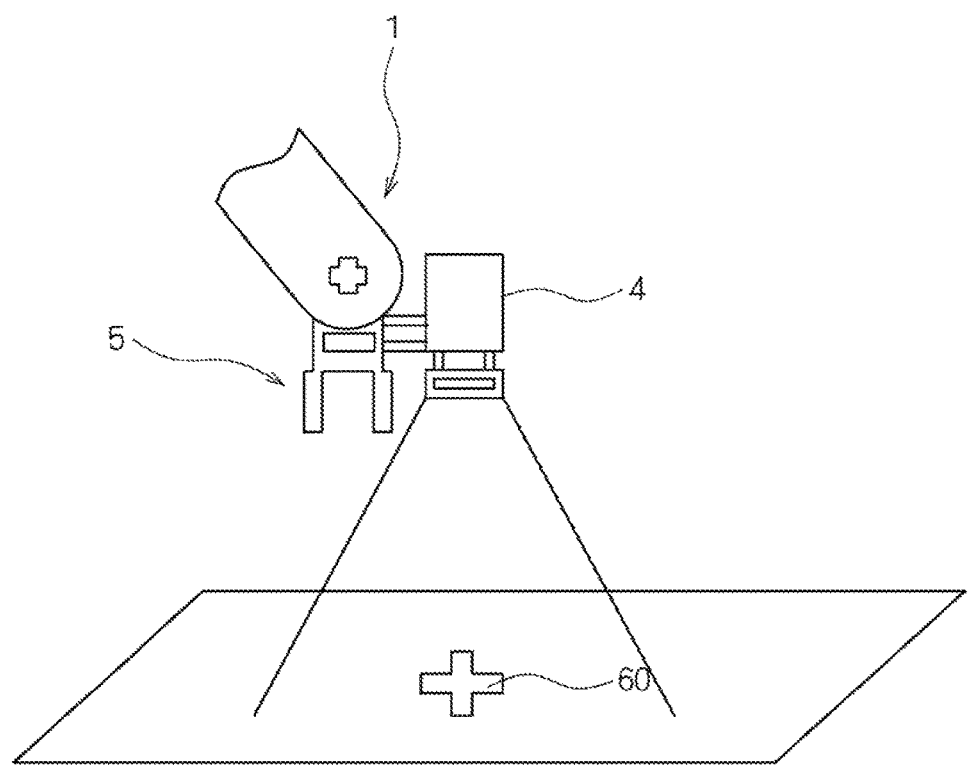
FIG. 21 is a schematic view showing a configuration of an on-hand type image processing system according to the first embodiment of the present invention.

The imaging device 4 may be integrally mounted on the end effector 5 of the manipulator 1. In this case, the imaging device 4 moves integrally with the end effector 5 (hereinafter referred to as on-hand type). FIG. 21 is a schematic view showing a configuration of an on-hand type image processing system according to the first embodiment of the present invention.

In FIG. 21, the imaging device 4 is provided integrally with the end effector 5 of the manipulator 1, and hence the mark 60 to become the imaging target is provided in an area an imaging of which can be captured by the imaging device 4. Then, the image is captured by the imaging device 4 while the end effector 5 is moved.

Figure 22A:
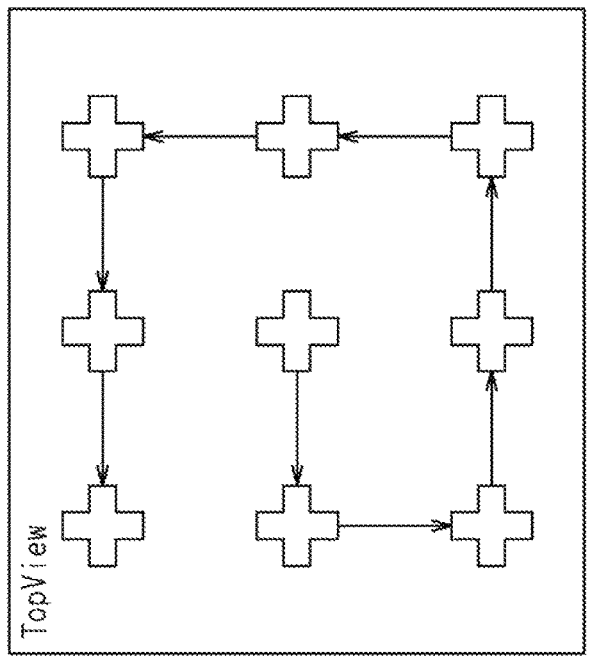
FIGS. 22A and 22B are schematic views showing imaging positions on the image processing apparatus in the on-hand type according to the first embodiment of the present invention.
Figure 22B:
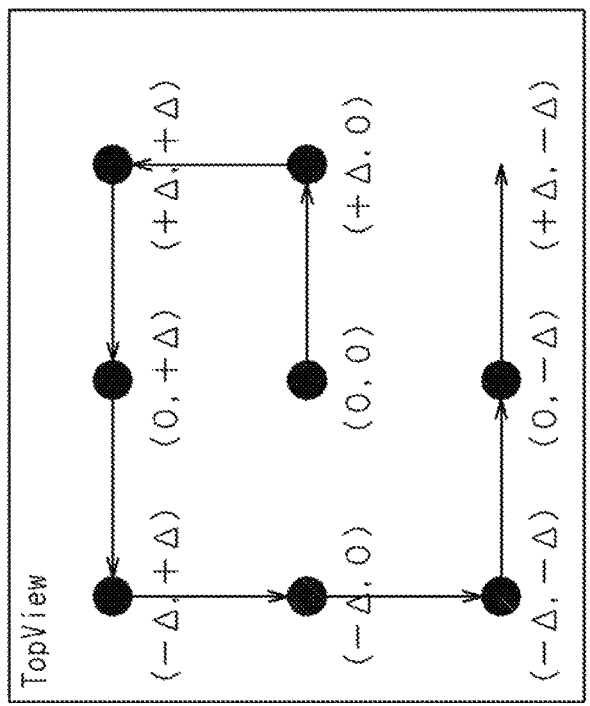

FIGS. 22A and 22B are schematic views showing imaging positions on the image processing apparatus 3 in the on-hand type according to the first embodiment of the present invention. FIG. 22A shows a movement sequence of the end effector 5, and the end effector 5 moves at regular intervals counterclockwise from the origin (0, 0). FIG. 22B shows a sequence of capturing an image of the mark 60 by the imaging device 4. Since the imaging device 4 moves integrally with the manipulator 1, the imaging device 4 captures the image at regular intervals from the origin (0, 0) such that the sequence becomes point-symmetric with that of FIG. 22A. That is, the image is captured at a position with a value obtained by multiplying a movement distance by '-1'.

Figures 23A, 23B:
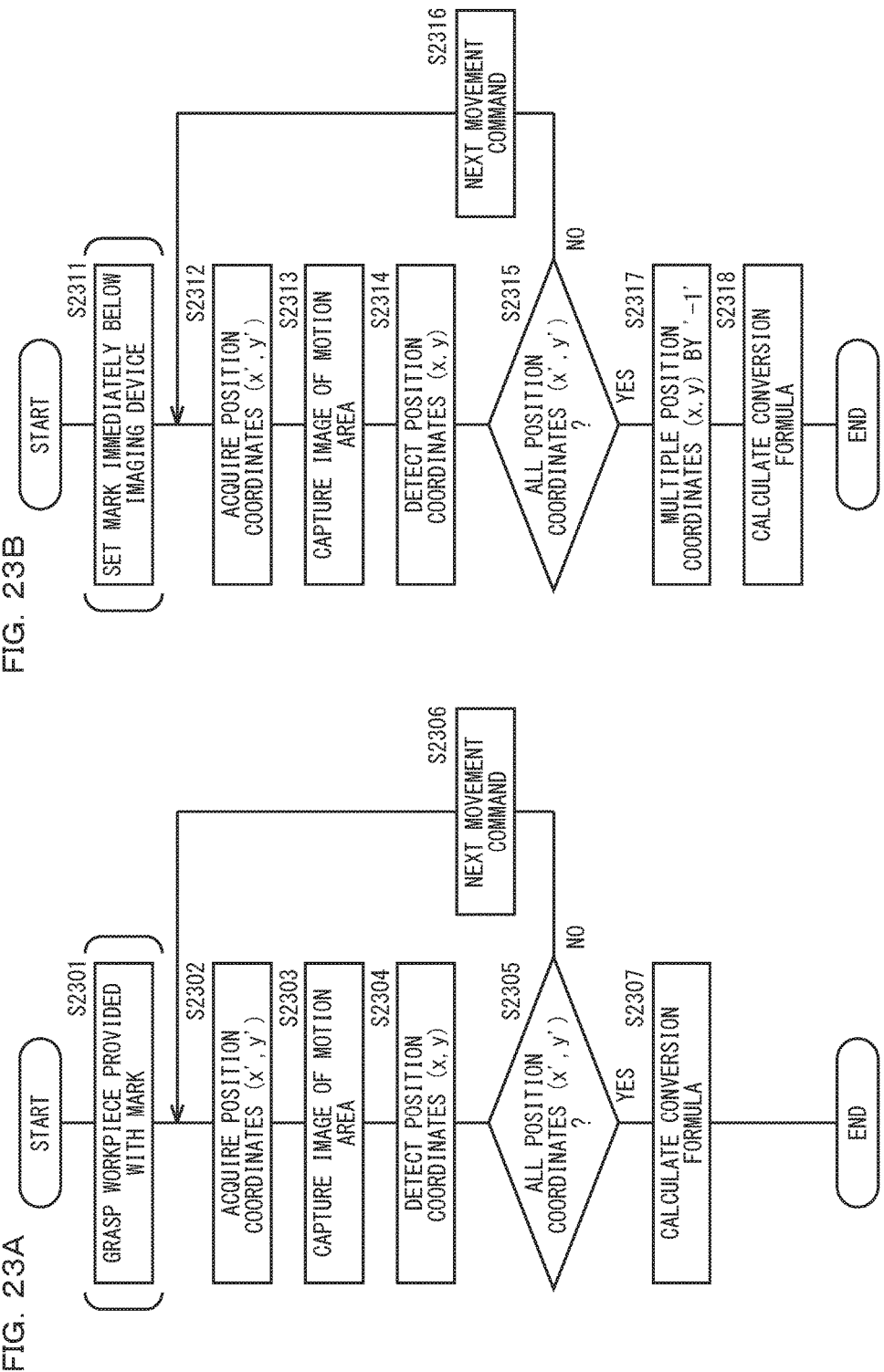
FIGS. 23A and 23B are flowcharts showing differences in processing procedure of the image processing apparatus according to the first embodiment of the present invention.

FIGS. 23A and 23B are flowcharts showing differences in processing procedure of the image processing apparatus 3 according to the first embodiment of the present invention. FIG. 23A shows a flowchart showing a processing procedure in the off-hand type, and FIG. 23B shows a flowchart showing a processing procedure in the on-hand type.

First, in the off-hand type, as shown in FIG. 23A, while the workpiece 6 which is provided with the mark 60 to become an imaging target is grasped by the manipulator 1 (Step S2301), the image processing apparatus 3 acquires position coordinates (x', y') of a movement destination (Step S2302), and captures an image of a motion area of the end effector 5 (Step S2303). The image processing apparatus 3 displays the image of the motion area, and detects position coordinates (x, y) on the displayed image (Step S2304).

The image processing apparatus 3 determines whether or not the position coordinates (x, y) on the image have been detected for all of the position coordinates (x', y') for calibration (Step S2305). When the image processing apparatus 3 determines that the position coordinates (x, y) on the image have not been detected for all of the position coordinates (x', y') (Step S2305: NO), the image processing apparatus 3 issues the next movement command (Step S2306) and returns the processing to Step S2302, to repeat the foregoing processing.

When the image processing apparatus 3 determines that the position coordinates (x, y) on the image have been detected for all of the position coordinates (x', y') (Step S2305: YES), the image processing apparatus 3 calculates a conversion formula in accordance with (Formula 1) (Step S2307). Specifically, the six coefficients a, b, c, d, e, f are obtained.

Next, in the on-hand type, as shown in FIG. 23B, while the mark 60 to become the imaging target is set immediately below the imaging device 4 (Step S2311), the image processing apparatus 3 acquires position coordinates (x', y') of a movement destination (Step S2312), and captures an image of a motion area of the end effector 5 (Step S2313). The image processing apparatus 3 displays the image of the motion area, and detects position coordinates (x, y) on the displayed image (Step S2314).

The image processing apparatus 3 determines whether or not the position coordinates (x, y) on the image have been detected for all of the position coordinates (x', y') for calibration (Step S2315). When the image processing apparatus 3 determines that the position coordinates (x, y) on the image have not been detected for all of the position coordinates (x', y') (Step S2315: NO), the image processing apparatus 3 issues the next movement command (Step S2316) and returns the processing to Step S2312, to repeat the foregoing processing.

When the image processing apparatus 3 determines that the position coordinates (x, y) on the image have been detected for all of the position coordinates (x', y') (Step S2315: YES), the image processing apparatus 3 multiplies the position coordinates (x, y) by '-1' (Step S2317), to calculate a conversion formula in accordance with (Formula 1) (Step S2318). Specifically, the six coefficients a, b, c, d, e, f are obtained.

As described above, according to the first embodiment, the image processing apparatus 3 can transmit to the robot controller 2 the movement command to control the motion the end effector 5 in the manipulator (robot) 1, thus eliminating the need for the user to understand machine language which varies by type of the manipulator (robot) 1. It is thus possible to obtain the conversion rule between the position coordinates recognized by the robot controller 2 (the first coordinate values) and the position coordinates detected from the captured image of the target (workpiece) 6 (the second coordinate values), so as to control the motion of the manipulator 1 with high accuracy.

(Second Embodiment)

A configuration of an image processing system and a configuration of the image processing apparatus 3 according to a second embodiment of the present invention are similar to those of the first embodiment. Hence constituents having the same functions are provided with the same numerals, and detailed descriptions thereof are thereby omitted. The second embodiment is different from the first embodiment in that picking of the workpiece (target) 6 is executed by use of a calibration result.

Figure 24:
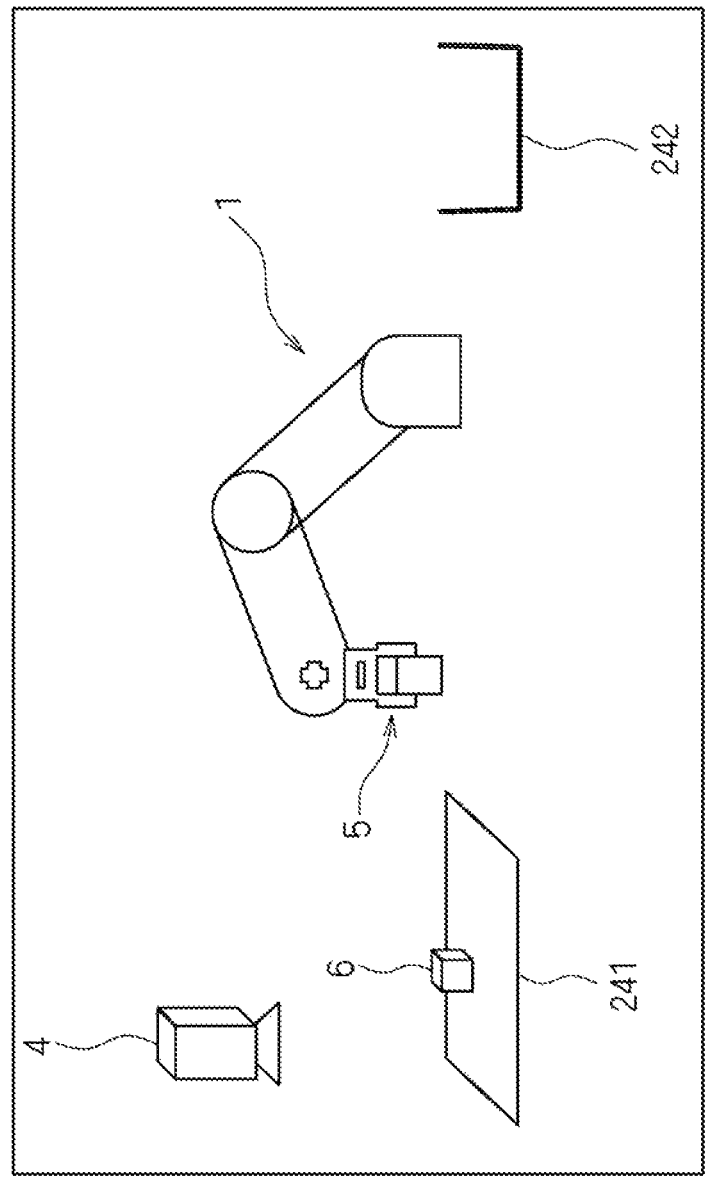
FIG. 24 is a schematic view for explaining execution of picking in an image processing system according to a second embodiment of the present invention.

FIG. 24 is a schematic view for explaining execution of picking in an image processing system according to the second embodiment of the present invention. As shown in FIG. 24, in the image processing system according to the present second embodiment, the workpiece 6 is moved from a pickup position 241 to a placing position 242. Specifically, while an image of the workpiece 6 at the pickup position 241 is captured by the imaging device 4, the workpiece 6 is grasped by the end effector 5 of the manipulator 1, moved to the placing position 242, and then released.

Figure 25:
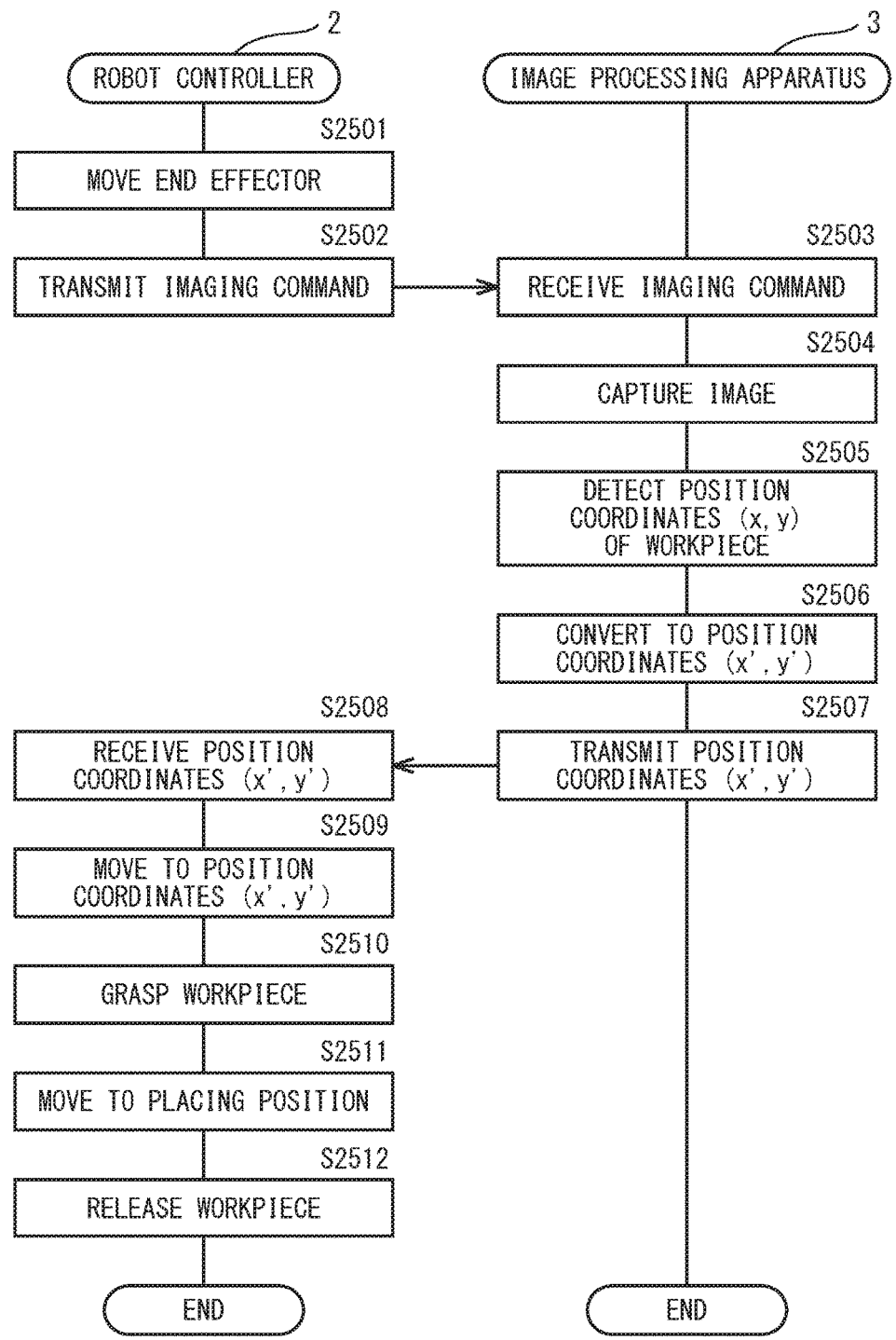
FIG. 25 is a flowchart showing a processing procedure for the picking in the image processing system according to the second embodiment of the present invention.

FIG. 25 is a flowchart showing a processing procedure for the picking in the image processing system according to the second embodiment of the present invention. As shown in FIG. 25, the robot controller 2 moves the end effector 5 of the manipulator 1 out of the imaging area in order to avoid a situation in which the end effector 5 of the manipulator 1 prevents the imaging device 4 from capturing an image of the workpiece 6 that is the imaging target (Step S2501).

The robot controller 2 transmits an imaging command to the image processing apparatus 3 (Step S2502). The image processing apparatus 3 receives the imaging command (Step S2503), and captures the image of the workpiece 6 (Step S2504). The image processing apparatus 3 displays the image of the workpiece 6, detects position coordinates (x, y) of the workpiece 6 on the displayed image (Step S2505), and converts them to position coordinates (x', y') by use of a conversion formula previously obtained by calibration (Step S2506).

Figure 26:
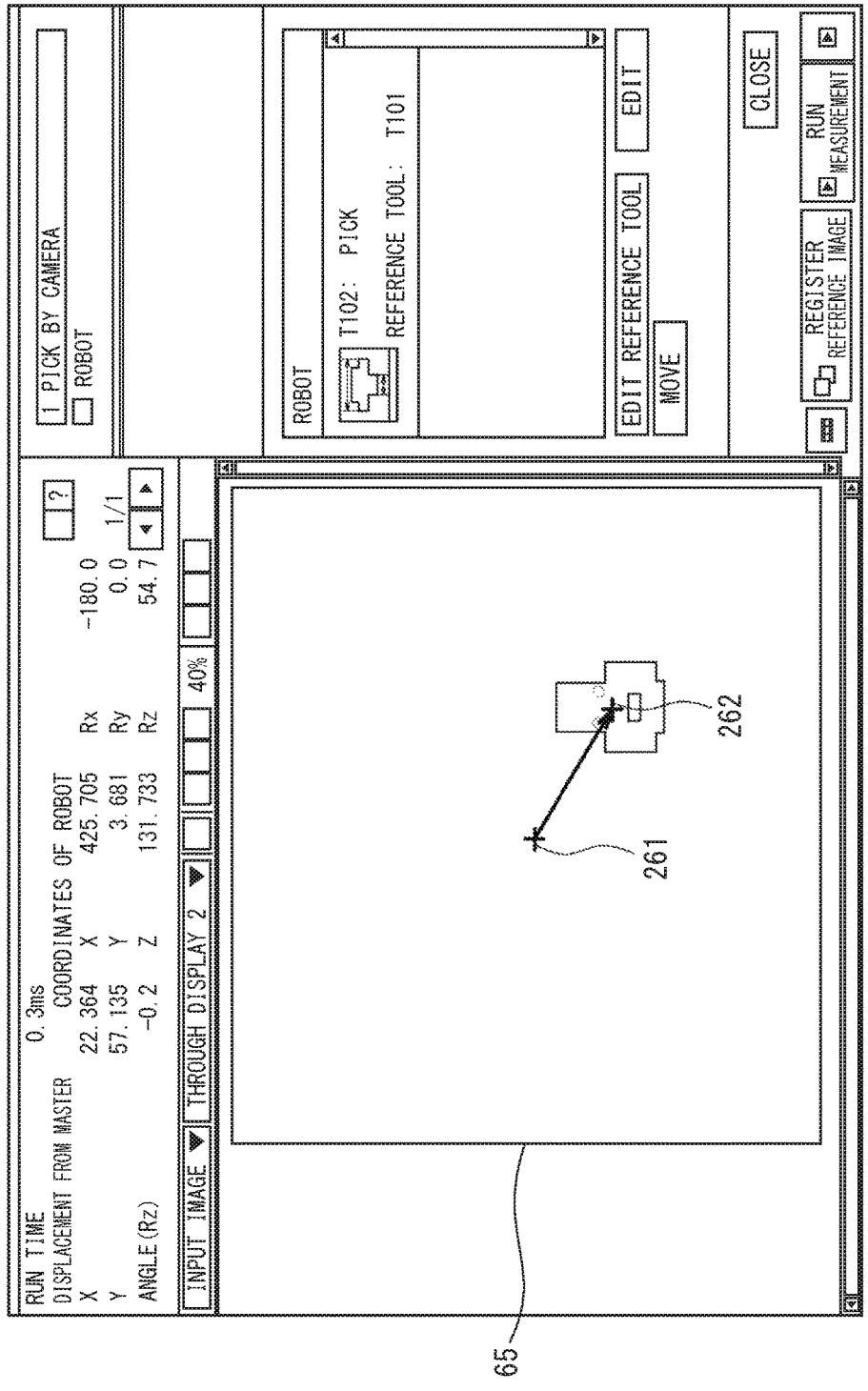
FIG. 26 is an illustrative view of a position detection screen for the workpiece in the image processing system according to the second embodiment of the present invention.

FIG. 26 is an illustrative view of a position detection screen for the workpiece 6 in the image processing system according to the second embodiment of the present invention. As shown in FIG. 26, the captured image of the workpiece 6 is displayed in the image display area 65.

A cross mark 261 indicates position coordinates at which the image of the workpiece 6 has been displayed, and a cross mark 262 indicates a movement destination of the workpiece 6.

Figure 27:
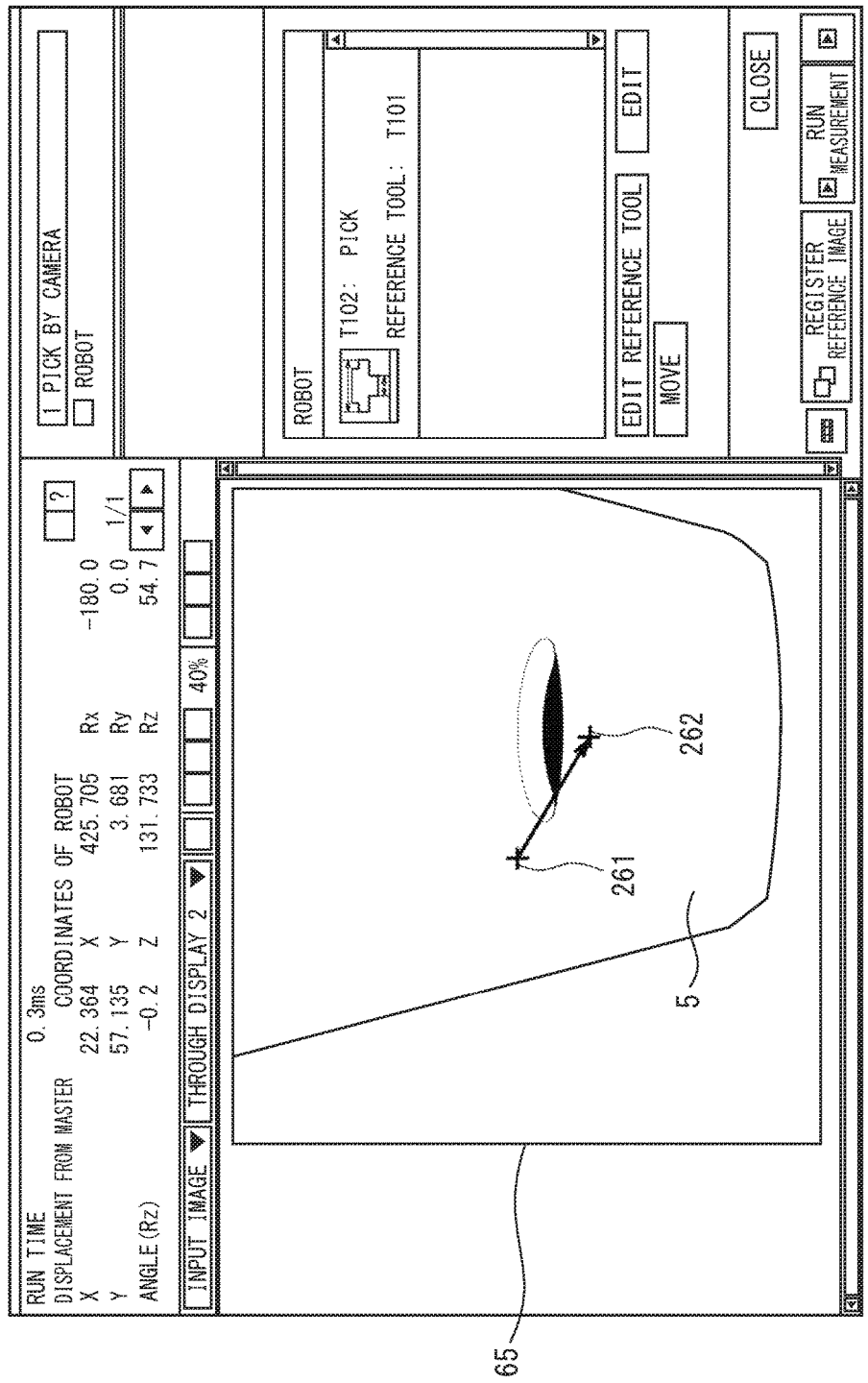
FIG. 27 is an illustrative view of a movement screen for the workpiece in the image processing system according to the second embodiment of the present invention.

FIG. 27 is an illustrative view of a movement screen for the workpiece 6 in the image processing system according to the second embodiment of the present invention. In the example of FIG. 27, since an image of the end effector 5 has been captured, the workpiece 6 is hidden behind the end effector 5 and is not displayed in the image.

However, the cross mark 261 and the cross mark 262 are displayed as superimposed on the image, the cross mark 261 showing the position coordinates at which the image of the workpiece 6 has been displayed, the cross mark 262 showing the movement destination of the workpiece 6. Accordingly, even when no image of the workpiece 6 itself is displayed, the end effector 5 may be moved to bring the screen into such a display state as in FIG. 26, and the movement destination may then be specified.

Figure 28:
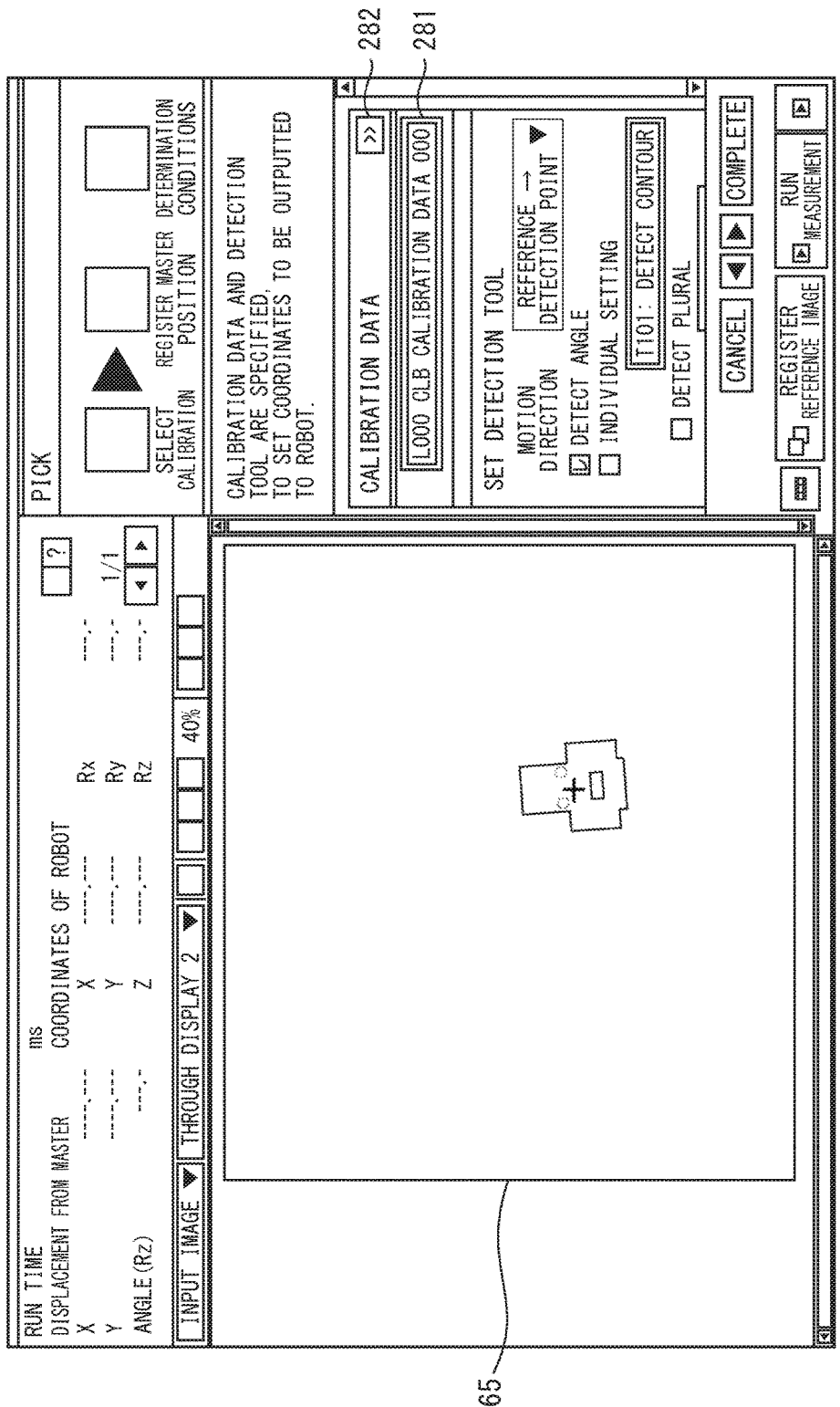
FIG. 28 is an illustrative view of a calibration result selection screen in the image processing system according to the second embodiment of the present invention.

It is to be noted that a plurality of results of calibration may be previously stored, and any of the results may be selected. FIG. 28 is an illustrative view of a calibration result selection screen in the image processing system according to the second embodiment of the present invention.

As shown in FIG. 28, when a calibration data display button 282 is clicked by a mouse operation or the like, stored calibration results are displayed in a pulldown menu 281. That is, since the conversion rule of (Formula 1) with the coefficients specified for each calibration is stored, the stored conversion rules are selectably displayed.

The user selects one calibration result from the pulldown menu 281. Hence it is possible to control the motion of the manipulator 1 with high accuracy.

Returning to FIG. 25, the image processing apparatus 3 transmits the converted actual position coordinates (x', y') to the robot controller 2 (Step S2507). The robot controller 2 receives the position coordinates (x', y') (Step S2508), and moves the end effector 5 to the pickup position 241 for grasping the workpiece 6 (Step S2509). The robot controller 2 makes the end effector 5 grasp the workpiece 6 (Step S2510).

The robot controller 2 makes the end effector 5 move to the placing position 242 while grasping the workpiece 6 (Step S2511), and release the workpiece 6 (Step S2512). In addition, it is possible to automatically generate a motion program for the processing other than the processing in Step S2510 and Step S2512.

Further, it is preferable to previously match the position of the end effector 5 of the manipulator 1 with the position on the image. This is for the purpose of obtaining the actual position coordinates (x', y') with high accuracy from the position coordinates (x, y) on the image which have been detected based on the image of the target 6.

Figure 29:
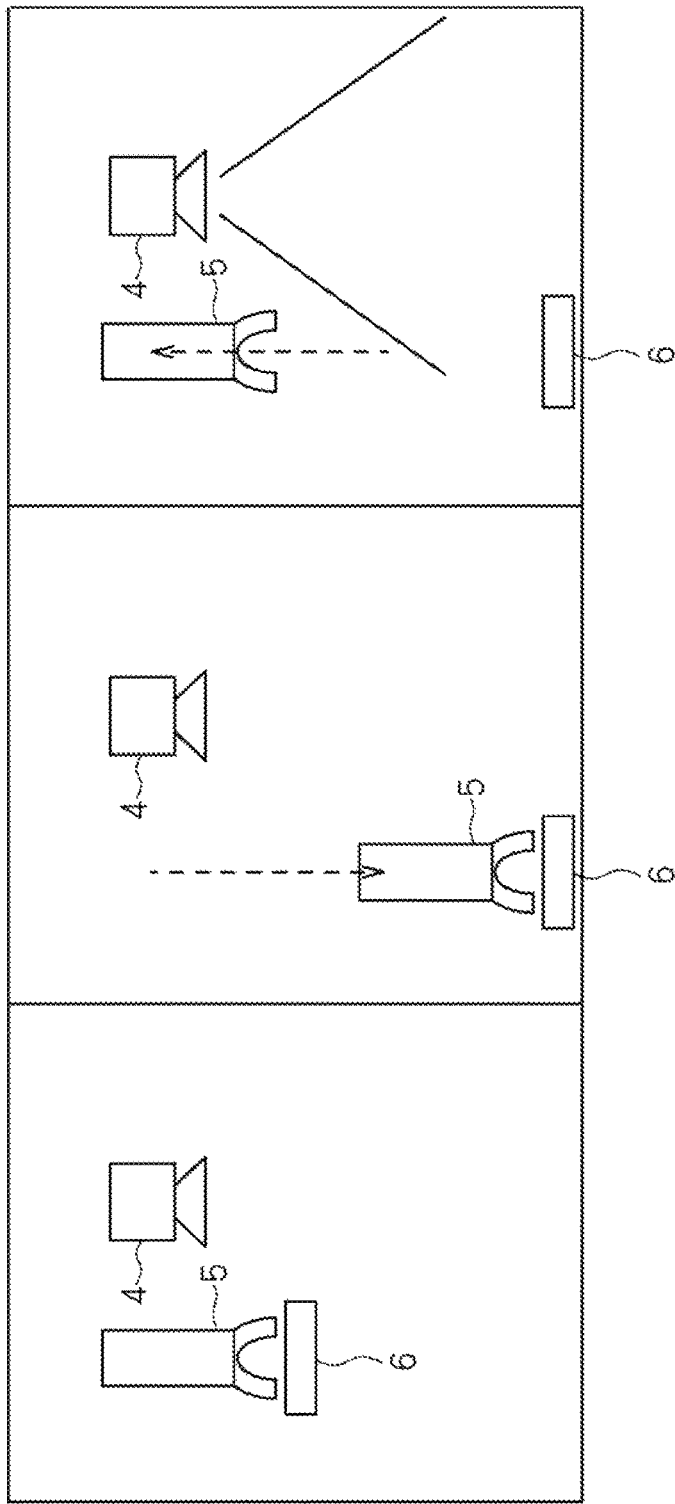
FIGS. 29A to 29C are schematic views for explaining master position registration processing of the image processing system according to the second embodiment of the present invention.

FIGS. 29A to 29C are schematic views for explaining master position registration processing of the image processing system according to the second embodiment of the present invention. First, as shown in FIG. 29A, the workpiece 6 is grasped by the end effector 5, and the position coordinates (x', y') in the grasped state are stored.

Next, as shown in FIG. 29B, the robot controller 2 makes the end effector 5 in the state of grasping the workpiece 6 move in an immediately downward position, and release the workpiece 6. As shown in FIG. 29C, after the workpiece 6 has been released, the end effector 5 is made to move immediately thereabove, and an image of the workpiece 6 is captured by the imaging device 4. When the end effector 5 of the manipulator 1 is included in the image captured by the imaging device 4, namely when the end effector 5 prevents the image of the workpiece 6 from being captured, the end effector 5 is moved so as not to be in the captured image, and the image is then captured by the imaging device 4. The captured image is stored into the storage unit 33 of the image processing apparatus 3.

As thus described, the image of the position at which the workpiece 6 is grasped and the position coordinates (x', y') are stored in association with each other, thereby allowing control of the motion such that, even when displacement has occurred between the position of the end effector 5 and the position of the workpiece 6, the end effector 5 can be moved to the position at which the end effector 5 can grasp the workpiece 6.

Figure 30:
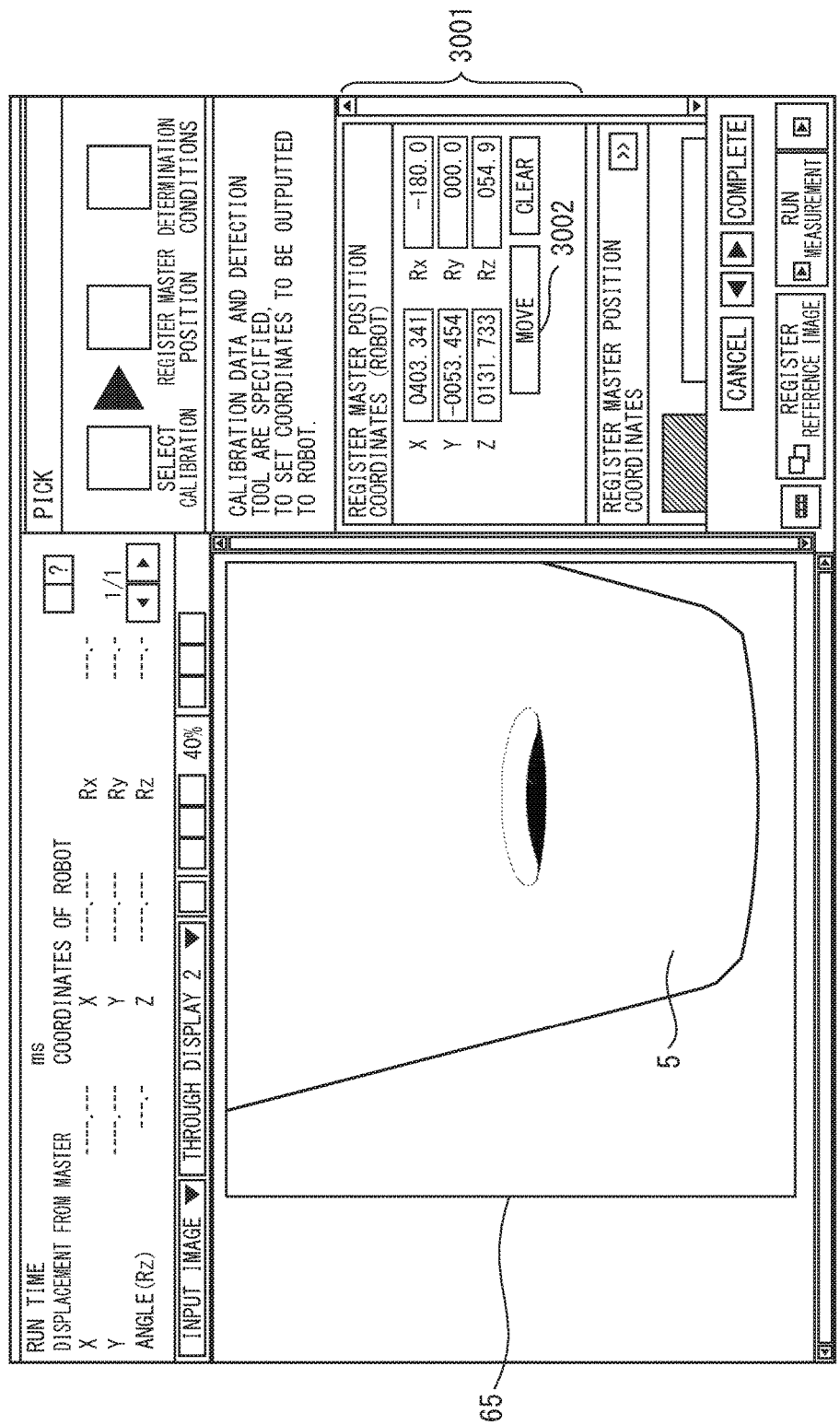
FIG. 30 is an illustrative view of a master position registration screen of an image processing apparatus according to the second embodiment of the present invention.

FIG. 30 is an illustrative view of a master position registration screen of the image processing apparatus 3 according to the second embodiment of the present invention. As shown in FIG. 30, with the workpiece 6 grasped by the end effector 5, the imaging device 4 acquires coordinate values of a central position TCP of the end effector 5 and coordinate values of position coordinates offset from the central position TCP. The coordinate values of the central position TCP of the end effector 5 and the coordinate values of the position coordinates offset from the central position TCP are displayed in a coordinate display area 3001.

Then, a click operation is performed on a movement button 3002 by the mouse or the like, to allow the end effector 5 of the manipulator 1 to easily return to the registered central position TCP of the end effector 5.

Figure 31:
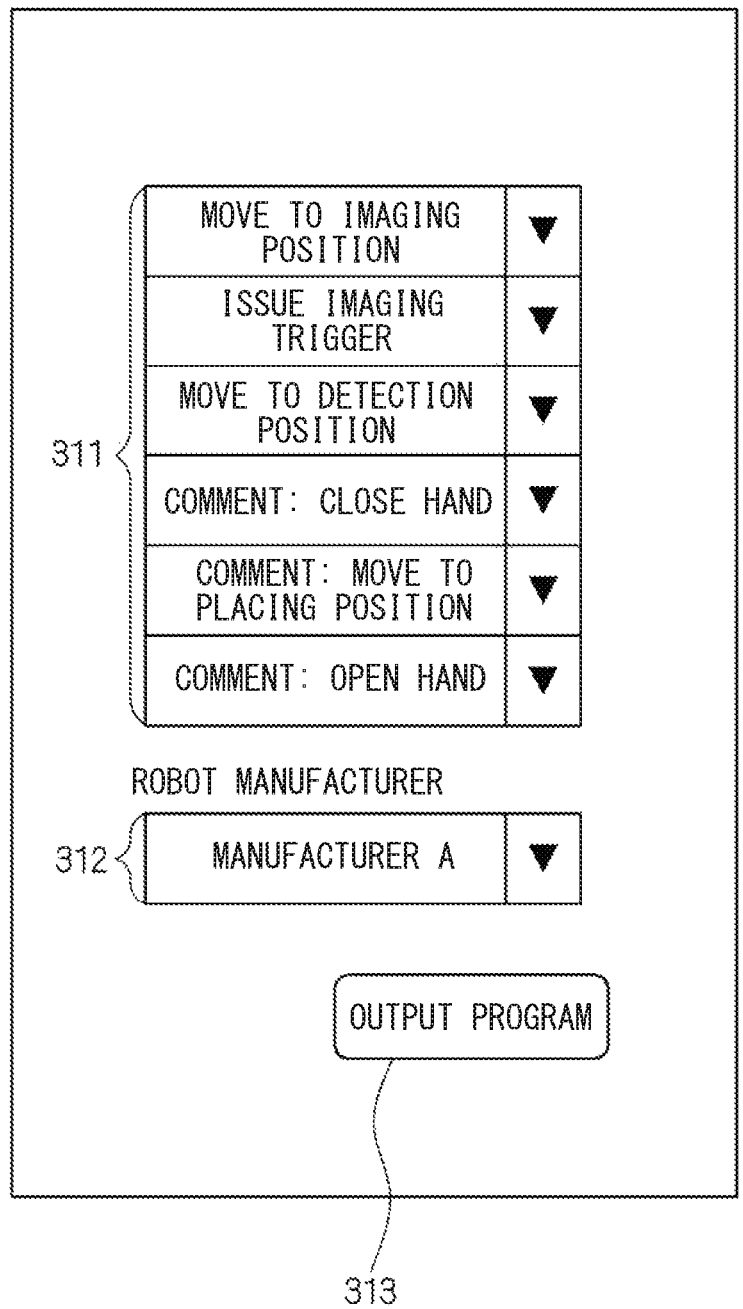
FIG. 31 is an illustrative view of a program generation screen of the image processing apparatus according to the second embodiment of the present invention.

A program, which is for controlling the motion of the manipulator 1 and is executed in the robot controller 2, may be automatically generated. FIG. 31 is an illustrative view of a program generation screen of the image processing apparatus 3 according to the second embodiment of the present invention.

In FIG. 31, in a sequence selection area 311, processing to be executed by a generated program is selected from a pulldown menu. Further, a manufacturer having manufactured the manipulator (robot) 1 to become a target for control by the generated program is selected in a manufacturer selection area 312. This is because a specification for the generated program varies by manufacturer.

With all settings having been completed, a click operation is performed on a program output button 313 by the mouse or the like, to generate a program for the robot controller 2. FIG. 32 is an illustrative view of the program for the robot controller 2 according to the second embodiment of the present invention.

As shown in FIG. 32, a source code 321 is a command to establish data communication with the image processing apparatus 3. A source code 322 is a command to retract the imaging device 4. A source code 323 is a coordinate value acquirement command to the image processing apparatus 3.

A source code 324 is a command to receive coordinate values from the image processing apparatus 3. A source code 325 is a command to convert the received position coordinates to actual position coordinates of the manipulator 1.

A source code 326 is a command to move the end effector 5 of the manipulator 1 to an output position. A source code 327 is a comment field, and by the user describing a source code therein by himself or herself, a more detailed program can be generated. A source code 328 is a command to cancel data communication with the image processing apparatus 3.

It is to be noted that in the foregoing example, the movement command is written as a character string and transmitted through non-protocol communication of Ethernet (registered trademark). However, for example in a common memory of the robot controller 2, a command is allocated to an address AAA while a command parameter is allocated to an address BBB, to allow formation of a command system by exchange of numerical data with no use of a character string. When a movement command as numerical values are received from the image processing apparatus 3, the address AAA is rewritten by a numerical number corresponding to the movement command "MV" and the address BBB is replaced by "100, 200, 300", which are then issued as a movement command to the manipulator 1.

Naturally, a protocol communication other than this may be used, such as protocol communication of Ethernet (registered trademark), PLC-Link, CC-Link or PROFINET.

As described above, according to the present second embodiment, a movement command and a motion command to control the motion of the end effector 5 of the manipulator 1 can be transmitted from the image processing apparatus 3 to the robot controller 2, thus eliminating the need to understand machine language which varies by type of the manipulator (robot) 1, and enabling the motion of the manipulator 1 to be controlled with high accuracy.

(Third Embodiment)

A configuration of an image processing system and a configuration of the image processing apparatus 3 according to a third embodiment of the present invention are similar to those of the first and second embodiments. Hence constituents having the same functions are provided with the same numerals, and detailed descriptions thereof are thereby omitted. The third embodiment is different from the first and second embodiments in performing a test operation by use of a result of calibration.

Figure 33:
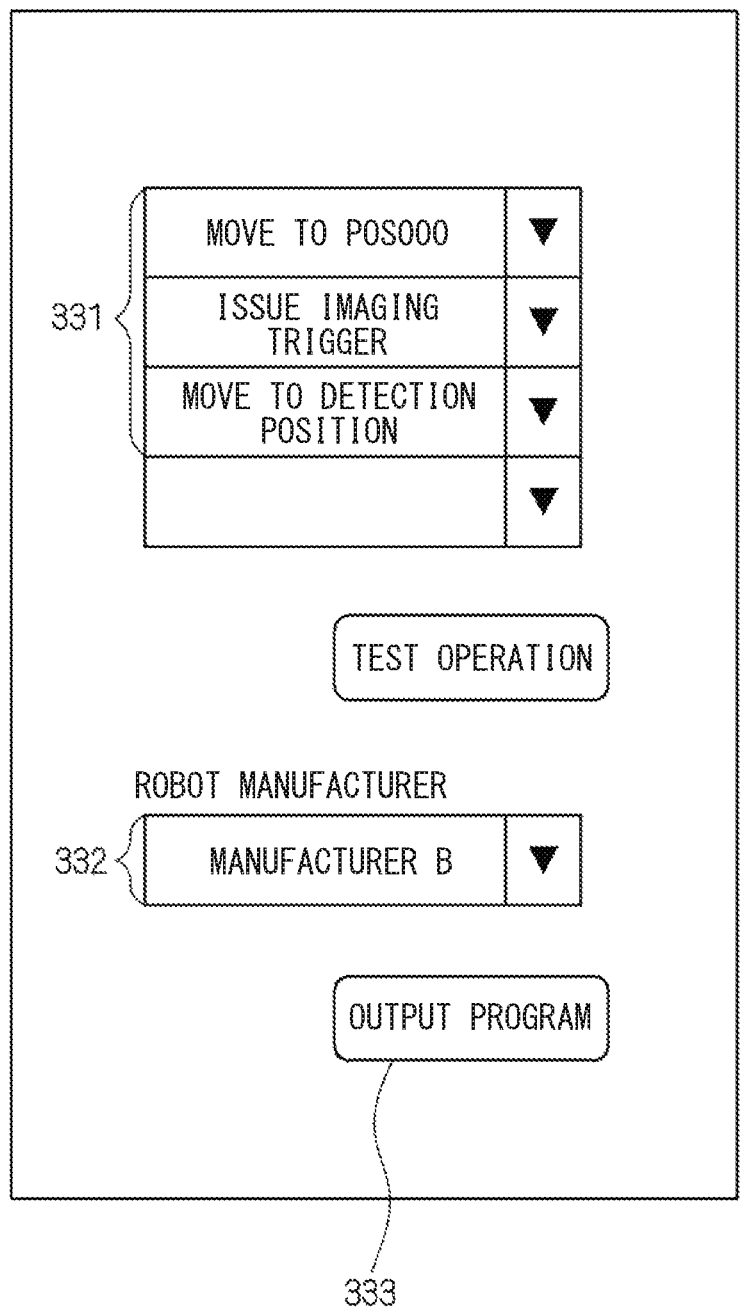
FIG. 33 is an illustrative view of a program generation screen of an image processing apparatus according to a third embodiment of the present invention.

A program, which is for performing the test operation of the manipulator 1 and is executed in the robot controller 2, is automatically generated as in the second embodiment. FIG. 33 is an illustrative view of a program generation screen of the image processing apparatus 3 according to the third embodiment of the present invention.

In FIG. 33, in a sequence selection area 331, processing to be executed by a generated program is selected from a pulldown menu. Further, a manufacturer having manufactured the manipulator (robot) 1 to become a target for control by the generated program is selected in a manufacturer selection area 332. This is because a specification for the generated program varies by manufacturer.

In the example of FIG. 33, specification is made to generate a program for controlling motions of moving to registered position coordinates ("POS000" is used as an identifier in FIG. 33), issuing an imaging trigger that indicates the timing for starting to capture an image, and moving to a position for grasping the workpiece 6. At the point of completion of the entire specification, a program output button 333 is clicked by a mouse operation or the like, to generate a program for the robot controller 2.

Figure 34:
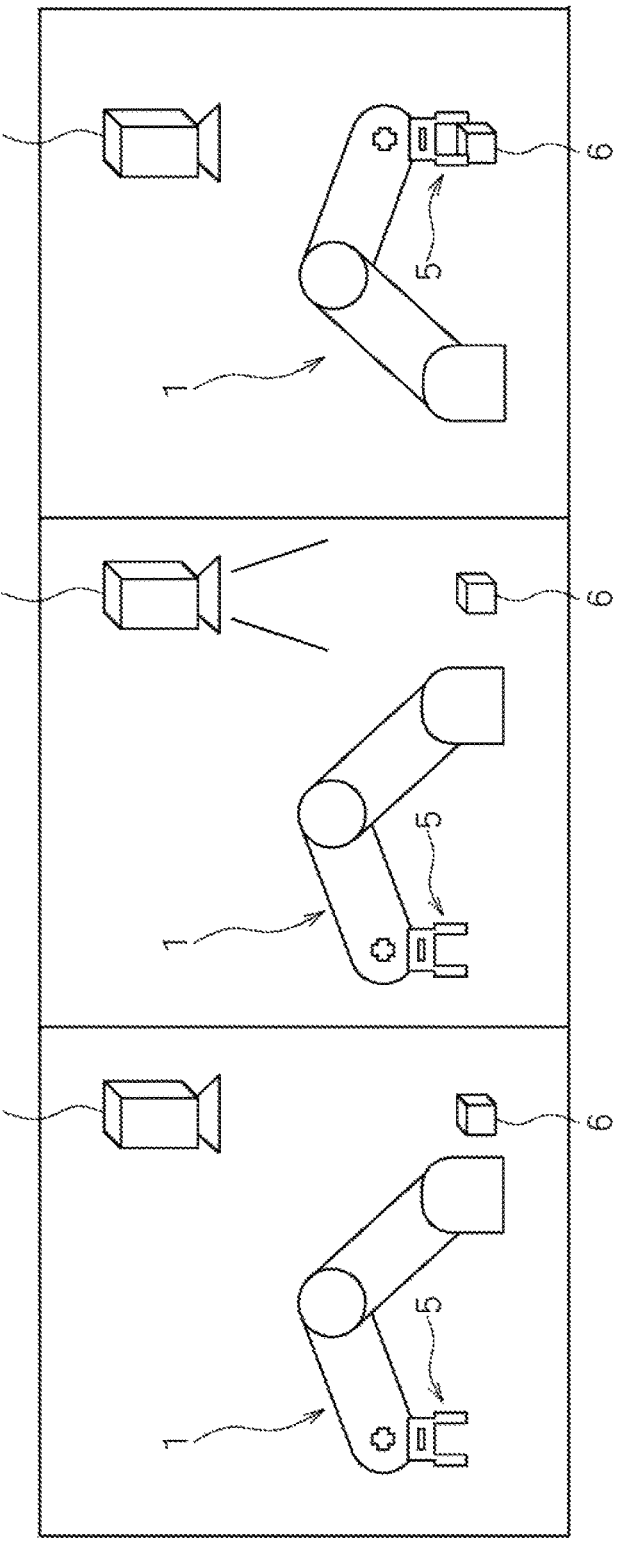
FIGS. 34A to 34C are schematic views for explaining motions during a test operation in the image processing system according to the third embodiment of the present invention.

Motions during the test operation are as shown in FIGS. 34A to 34C. FIGS. 34A to 34C are schematic views for explaining the motions during the test operation in the image processing system according to the third embodiment of the present invention.

First, as shown in FIG. 34A, in order to allow an image of the workpiece 6 to be captured, the image processing system according to the present third embodiment moves the end effector 5 of the manipulator 1 to a position "POS000" different from a position at which the workpiece 6 is placed. In this state, as shown in FIG. 34B, the image of the workpiece 6 is captured in accordance with the imaging trigger. Lastly, as shown in FIG. 34C, the end effector 5 of the manipulator 1 is moved to the position (detection position) at which the workpiece 6 is placed, so as to grasp the workpiece 6.

Figure 35:
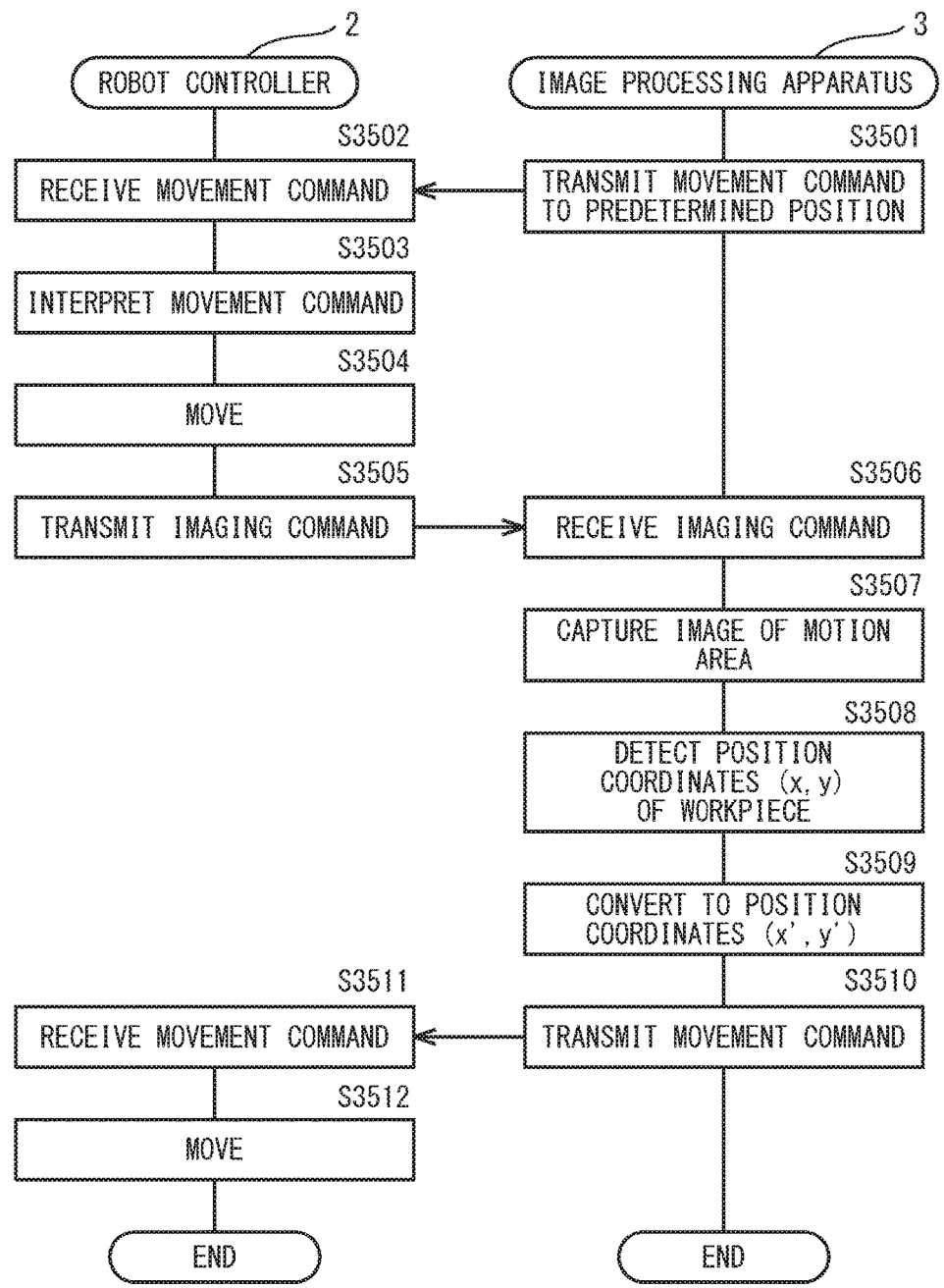
FIG. 35 is a flowchart showing a processing procedure during the test operation of the image processing system according to the third embodiment of the present invention.

FIG. 35 is a flowchart showing a processing procedure during the test operation of the image processing system according to the third embodiment of the present invention. As shown in FIG. 35, the image processing apparatus 3 transmits a command to move to a predetermined position ("POS000" in the example of FIG. 33) to the robot controller 2 (Step S3501).

The robot controller 2 receives the movement command from the image processing apparatus 3 (Step S3502), and interprets the movement command in accordance with the type of the manipulator 1 (Step S3503). That is, the command is translated to a load module in machine language that can activate the manipulator 1.

The robot controller 2 moves the end effector 5 to the position specified by the movement command ("POS000" in the example of FIG. 33) (Step S3504), and transmits an imaging command to the image processing apparatus 3 (S3505).

The image processing apparatus 3 receives the imaging command (Step S3506), and captures an image of a motion area of the end effector 5 (Step S3507). The image processing apparatus 3 displays the image of the motion area of the end effector 5, detects position coordinates (x, y) of the workpiece 6 on the displayed image (Step S3508), and converts them to position coordinates (x', y') by use of a conversion formula previously obtained by calibration (Step S3509).

The image processing apparatus 3 transmits a movement command to the position coordinates (x', y') to the robot controller 2 (Step S3510). The robot controller 2 receives the movement command (Step S3511), and moves the end effector 5 to the converted position coordinates (x', y') (Step S3512).

As described above, according to the present third embodiment, a movement command and a motion command to control the motion of the end effector 5 of the manipulator 1 can be transmitted from the image processing apparatus 3 to the robot controller 2, thus eliminating the need to understand machine language which varies by type of the manipulator (robot) 1, and enabling the test operation of the manipulator 1 to be performed so as to check whether or not it correctly makes motions.

In addition, the present invention is not restricted to the above embodiment, and a variety of changes, modifications and the like can be made so long as being within the scope of the gist of the present invention. For example, using a motion controller in place of the robot controller 2 can expand an application range.

Further, although the example of using the two-dimensional affine transformation as calibration has been described, a three-dimensional affine transformation may naturally be used. In this case, a conversion formula of affine transformation is as in (Formula 2).

[Mathematical Formula 2]

$$\begin{pmatrix} x' \\ y' \\ z' \\ 1 \end{pmatrix} = \begin{pmatrix} a_{xx} & a_{yx} & a_{zz} & b_x \\ a_{zy} & a_{yy} & a_{zy} & b_y \\ a_{zz} & a_{yz} & a_{zz} & b_z \\ 0 & 0 & 0 & 1 \end{pmatrix} \times \begin{pmatrix} x \\ y \\ z \\ 1 \end{pmatrix} \quad \text{(Formula 2)}$$

Specifically, images of the workpiece 6 held in a space are captured by a plurality of imaging devices 4, thereby to obtain each coefficient of a conversion formula between coordinate values (x, y, z) being position coordinates of the workpiece 6 on the image and space coordinate values (x', y', z') being actual position coordinates.

Figure 36:
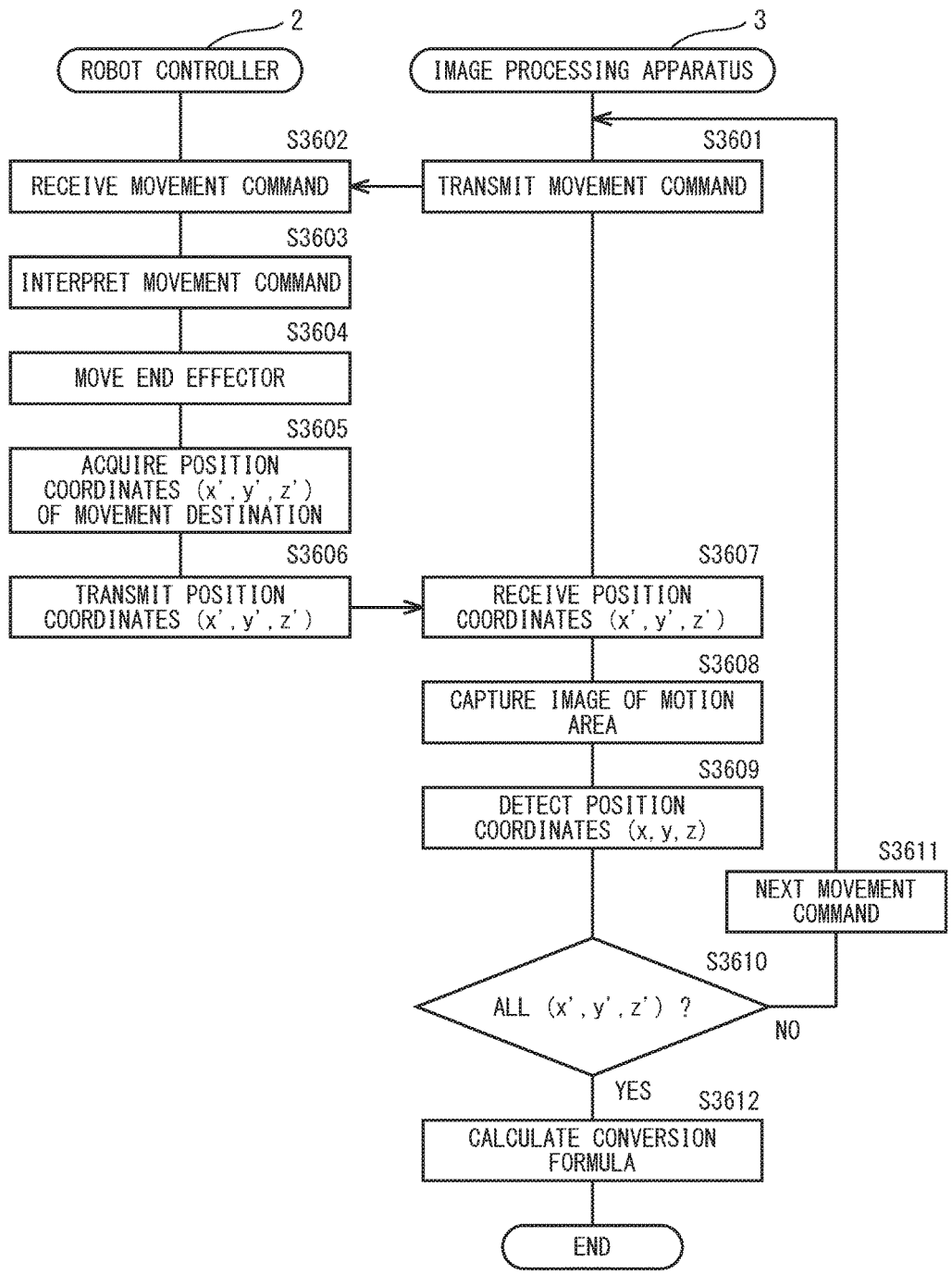
FIG. 36 is a flowchart showing a processing procedure for three-dimensional calibration of the image processing system according to the embodiment of the present invention.

FIG. 36 is a flowchart showing a processing procedure for three-dimensional calibration of the image processing system according to the embodiment of the present invention. As shown in FIG. 36, the image processing apparatus 3 transmits a movement command to the robot controller 2 (Step S3601). The robot controller 2 receives the movement command (Step S3602), and interprets the movement command in accordance with the type of the manipulator 1 (Step S3603). That is, the command is translated to a load module in machine language that can activate the manipulator 1.

The robot controller 2 moves the end effector 5 to a position specified by the movement command (Step S3604). The robot controller 2 acquires position coordinates (x', y', z') of the movement destination of the moved end effector 5 (Step S3605), and transmits the acquired position coordinates (x', y', z') to the image processing apparatus 3 (Step S3606).

The image processing apparatus 3 receives the acquired position coordinates (x', y', z') from the robot controller 2 (Step S3607), and captures an image of a motion area of the end effector 5 (Step S3608). The image processing apparatus 3 displays the image of the motion area, and detects position coordinates (x, y, z) on the displayed image (Step S3609).

The image processing apparatus 3 determines whether or not the position coordinates (x, y, z) on the image have been detected for all of the position coordinates (x', y', z') for calibration (Step S3610). When the image processing apparatus 3 determines that the position coordinates (x, y, z) on the image have not been detected for all of the position coordinates (x', y', z') (Step S3610: NO), the image processing apparatus 3 issues the next movement command (Step S3611) and returns the processing to Step S3601, to repeat the foregoing processing.

When the image processing apparatus 3 determines that the position coordinates (x, y, z) on the image have been detected for all of the position coordinates (x', y', z') (Step S3610: YES), the image processing apparatus 3 calculates a conversion formula in accordance with (Formula 2) (Step S3612). Specifically, twelve coefficients $a_{xx}$ to $a_{zz}$, $b_x$, $b_y$, and $b_z$ are obtained.

What is claimed is:
1. An image processing apparatus comprising:
a communication device capable of performing data communication with a robot controller that controls a motion of an end effector of the robot, wherein the robot controller is external from the image processing apparatus;
an imaging device that captures an image of a calibration target grasped by the end effector;
a command transmitting unit for transmitting to the robot controller a movement command in a common format to move the end effector to a plurality of predetermined positions so as to change a relative position of the calibration target, which becomes an imaging target, with respect to the imaging device, wherein the movement command in the common format is interpreted and converted to the movement command to the end effector in accordance with a type of the robot by a conversion program installed in the robot controller and wherein the movement command includes an order code and positions of movement destinations;
a movement coordinate acquiring unit for acquiring first coordinate values being each of position coordinates of the end effector having moved in accordance with the movement command to the end effector;
an imaging controlling unit for controlling an operation of the imaging device so as to capture an image of the calibration target at each movement destination, to which the end effector has moved;
an image detecting unit for detecting second coordinate values being position coordinates of the calibration target based on the image of the calibration target captured at each movement destination; and
a calibration executing unit for calculating a conversion rule between both of the coordinates based on the plurality of acquired first coordinate values and the plurality of detected second coordinate values;
wherein the conversion program is provided for each type of the robot, and when the movement command is received and the order code is detected in the movement command, the conversion program converts the positions of movement destinations to a movement command to the end effector in accordance with the type of the robot.
2. The image processing apparatus according to claim 1, wherein the command transmitting unit transmits to the robot controller the movement command including at least a movement instruction and position coordinates of the movement destination.

3. The image processing apparatus according to claim 1, comprising:
   a coordinate detecting unit for detecting the second coordinate values being position coordinates of the imaged target; and
   a coordinate converting unit for converting the detected second coordinate values to the first coordinate values based on the conversion rule.

4. The image processing apparatus according to claim 3, comprising:
   a display unit for displaying the captured image of the calibration target; and
   a position specification accepting unit for accepting specification of a position on the displayed image of the calibration target,
   wherein the second coordinate values at the accepted specified position are converted to the first coordinate values by the coordinate converting unit based on the conversion rule.

5. The image processing apparatus according to claim 1, wherein the first coordinate values acquired by the movement coordinate acquiring unit are converted to the second coordinate values based on the conversion rule, and the converted values are superimposed and displayed on the displayed image of the calibration target.

6. An image processing system comprising:
   a robot controller that controls a motion of an end effector of the robot, wherein the robot controller is external from the image processing apparatus; and
   an image processing apparatus including a communication device connected to the robot controller so as to perform data communication with the robot controller, and an imaging device that captures an image of a calibration target grasped by the end effector,
   wherein the image processing apparatus includes
      a command transmitting unit for transmitting to the robot controller a movement command in a common format to move the end effector to a plurality of predetermined positions so as to change a relative position of the calibration target, which becomes an imaging target, with respect to the imaging device, wherein the movement command in the common format is interpreted and converted to the movement command to the end effector in accordance with a type of the robot by a conversion program installed in the robot controller and wherein the movement command includes an order code and positions of movement destinations,
      a movement coordinate acquiring unit for acquiring first coordinate values being each of position coordinates of the end effector having moved in accordance with the movement command to the end effector,
      an imaging controlling unit for controlling an operation of the imaging device so as to capture an image of the calibration target at each movement destination, to which the end effector has moved,
      an image detecting unit for detecting second coordinate values being position coordinates of the calibration target based on the image of the calibration target captured at each movement destination, and
      a calibration executing unit for calculating a conversion rule between both of the coordinates based on the plurality of acquired first coordinate values and the plurality of detected second coordinate values,
   wherein the conversion program is installed in the robot controller and provided for each type of the robot, and when the movement command is received and the order code is detected in the movement command, the conversion program converts the positions of movement destinations to a movement command to the end effector in accordance with the type of the robot.

7. The image processing system according to claim 6, wherein the command transmitting unit transmits to the robot controller the movement command including at least a movement instruction and position coordinates of the movement destination.

8. The image processing system according to claim 6, wherein
   the image processing apparatus includes
      a coordinate detecting unit for detecting the second coordinate values being position coordinates of the imaged target, and
      a coordinate converting unit for converting the detected second coordinate values to the first coordinate values based on the conversion rule.

9. The image processing system according to claim 8, wherein
   the image processing apparatus includes
      a display unit for displaying the captured image of the calibration target, and
      a position specification accepting unit for accepting specification of a position on the displayed image of the calibration target, and
   the image processing apparatus converts the second coordinate values at the specification accepted position to the first coordinate values based on the conversion rule.

10. The image processing system according to claim 6, wherein the image processing apparatus converts the first coordinate values acquired by the movement coordinate acquiring unit to the second coordinate values based on the conversion rule, and superimposes and displays the converted values on the displayed image of the calibration target.

11. The image processing system according to claim 6, wherein the robot controller includes a program converting unit for interpreting the movement command and converting the interpreted command to a movement command to the end effector.

12. The image processing system according to claim 11, wherein the program converting unit is provided for each type of the robot, and converts the movement command to a movement command to the end effector in accordance with the type of the robot.

13. An image processing method which can be executed by an image processing system composed of:
   a robot controller that controls a motion of an end effector of the robot, wherein the robot controller is external from the image processing apparatus; and
   an image processing apparatus including a communication device connected to the robot controller so as to perform data communication with the robot controller, and an imaging device that captures an image of a calibration target grasped by the end effector,
   the image processing method comprising the steps of:
   transmitting to the robot controller a movement command in a common format to move the end effector to a plurality of predetermined positions so as to change a relative position of the calibration target, which becomes an imaging target, with respect to the imaging device, wherein the movement command in the common format is interpreted and converted to the movement command to the end effector in accordance with a type of the robot by a conversion program installed in the robot controller and wherein the movement command includes an order code and positions of movement destinations;

acquiring first coordinate values being each of position coordinates of the end effector having moved in accordance with the movement command to the end effector;

controlling an operation of the imaging device so as to capture an image of the calibration target at each movement destination, to which the end effector has moved;

detecting second coordinate values being position coordinates of the calibration target based on the image of the calibration target captured at each movement destination; and calculating a conversion rule between both of the coordinates based on the plurality of acquired first coordinate values and the plurality of detected second coordinate values;

wherein the conversion program is installed in the robot controller and provided for each type of the robot, and when the movement command is received and the order code is detected in the movement command, the conversion program converts the positions of movement destinations to a movement command to the end effector in accordance with the type of the robot.

* * * * *